US011676296B2

(12) United States Patent
Chiu et al.

(10) Patent No.: US 11,676,296 B2
(45) Date of Patent: Jun. 13, 2023

(54) AUGMENTING REALITY USING SEMANTIC SEGMENTATION

(71) Applicant: SRI International, Menlo Park, CA (US)

(72) Inventors: Han-Pang Chiu, West Windsor, NJ (US); Supun Samarasekera, Skillman, NJ (US); Rakesh Kumar, West Windsor, NJ (US); Ryan Villamil, Plainsboro, NJ (US); Varun Murali, Princeton Junction, NJ (US); Gregory Drew Kessler, Yardley, PA (US)

(73) Assignee: SRI INTERNATIONAL, Menlo Park, CA (US)

( * ) Notice: Subject to any disclaimer, the term of this patent is extended or adjusted under 35 U.S.C. 154(b) by 688 days.

(21) Appl. No.: 16/101,201

(22) Filed: Aug. 10, 2018

(65) Prior Publication Data
US 2019/0051056 A1   Feb. 14, 2019

Related U.S. Application Data

(60) Provisional application No. 62/544,674, filed on Aug. 11, 2017.

(51) Int. Cl.
*G06T 7/579* (2017.01)
*G06T 19/00* (2011.01)
(Continued)

(52) U.S. Cl.
CPC .......... *G06T 7/579* (2017.01); *G06F 16/5838* (2019.01); *G06F 16/903* (2019.01);
(Continued)

(58) Field of Classification Search
CPC ......... G06T 19/006; G06T 17/05; G06T 7/70; G06T 7/74; G06T 11/00; G06T 15/00; G06T 19/003
See application file for complete search history.

(56) References Cited

U.S. PATENT DOCUMENTS 9,031,809 B1 *  5/2015  Kumar ............... G01C 21/165
                                                    702/150
2015/0371440 A1 * 12/2015  Pirchheim ............ G06T 17/05
                                                    345/419
(Continued)

FOREIGN PATENT DOCUMENTS

WO      2017172778 A1    10/2017

OTHER PUBLICATIONS

Baatz et al., "Large Scale Visual Geo-Localization of Images in Mountainous Terrain," European Conference on Computer Vision, Springer-Verlag Berlin Heidelberg, Online ISBN 978-3-642-33709-3, 2012. (Applicant points out, in accordance with MPEP 609.04(a), that the year of publication, 2012, is sufficiently earlier than the effective U.S filing date, so that the particular month of publication is not in issue.).

(Continued)

*Primary Examiner* — Weiming He
(74) *Attorney, Agent, or Firm* — Shumaker & Sieffert, P.A.

(57) ABSTRACT

Techniques for augmenting a reality captured by an image capture device are disclosed. In one example, a system includes an image capture device that generates a two-dimensional frame at a local pose. The system further includes a computation engine executing on one or more processors that queries, based on an estimated pose prior, a reference database of three-dimensional mapping information to obtain an estimated view of the three-dimensional mapping information at the estimated pose prior. The computation engine processes the estimated view at the estimated pose prior to generate semantically segmented sub-views of the estimated view. The computation engine correlates, based on at least one of the semantically segmented sub-views of the estimated view, the estimated view to the two-dimensional frame. Based on the correlation, the (Continued)

computation engine generates and outputs data for augmenting a reality represented in at least one frame captured by the image capture device.

22 Claims, 8 Drawing Sheets

(51) Int. Cl.

| | |
|---|---|
| G06T 7/136 | (2017.01) |
| G06N 3/08 | (2023.01) |
| G06F 16/903 | (2019.01) |
| G06F 16/583 | (2019.01) |
| G06T 7/521 | (2017.01) |
| G06T 7/143 | (2017.01) |
| G06T 7/11 | (2017.01) |
| G06V 20/58 | (2022.01) |
| G06V 20/56 | (2022.01) |
| G06F 18/24 | (2023.01) |
| G06V 20/20 | (2022.01) |
| G01S 17/89 | (2020.01) |
| G01S 17/86 | (2020.01) |

(52) U.S. Cl.
CPC ............... *G06F 18/24* (2023.01); *G06N 3/08* (2013.01); *G06T 7/11* (2017.01); *G06T 7/136* (2017.01); *G06T 7/143* (2017.01); *G06T 7/521* (2017.01); *G06T 19/006* (2013.01); *G06V 20/20* (2022.01); *G06V 20/56* (2022.01); *G06V 20/582* (2022.01); *G06V 20/588* (2022.01); *G01S 17/86* (2020.01); *G01S 17/89* (2013.01); *G06T 2207/10016* (2013.01); *G06T 2207/10021* (2013.01); *G06T 2207/10028* (2013.01); *G06T 2207/10032* (2013.01); *G06T 2207/30212* (2013.01); *G06T 2207/30244* (2013.01); *G06T 2207/30248* (2013.01)

(56) References Cited

U.S. PATENT DOCUMENTS

2019/0130603 A1* 5/2019 Sun ..................... G06K 9/00208
2019/0353500 A1* 11/2019 Di Pietro ............... G06N 20/00

OTHER PUBLICATIONS

Baatz et al., "Leveraging Topographic Maps for Image to Terrain Alignment," 2012 Second Joint Conference: 3D Imaging, Modeling, Processing, Visualization & Transmission, Oct. 13-15, 2012, 6 pp.
Badrinarayanana et al., "SegNet: A Deep Convolutional Encoder-Decoder Architecture for Robust Semantic Pixel-Wise Labelling," CVPR, Nov. 14, 2014, 10 pp.
Bansal et al., "Geometric Urban Geo-Localization," Computer Vision Foundation, Jun. 23-28, 2014, 8 pp.
Barrow et al., "Parametric Correspondence and Chamfer Matching:Two New Techniques for Image Matching," Proceedings of the Fifth International Joint Conference on Artificial Intelligence (ii), Contents vol. 2, Aug. 22-25, 1977, 10 pp.
Brostow et al., "Semantic object classes in video: A high-definition ground truth database," Pattern Recognition Letters, Elsevier, vol. 30, Issue 2, Jan. 15, 2009, 10 pp.
Calonder et al., "BRIEF: Binary Robust Independent Elementary Features," Proceedings of the 11th European Conference on Computer Vision, Sep. 5-11, 2010, 14 pp.
Chiu et al., "Class-Specific Grasping of 3D Objects from a Single 2D Image," IEEE International Conference on Intelligent Robots and Systems,Oct. 18-22, 2010, 7 pp.
Eigen et al., "Predicting Depth, Surface Normals and Semantic Labels with a Common Multi-Scale Convolutional Architecture," IEEE International Conference on Computer Vision, Dec. 7-13, 2015, 9 pp.
Engel et al., "LSD-SLAM: Large-Scale Direct Monocular SLAM," European Conference on Computer Vision, ECCV 2014, Sep. 6-12, 2014, 16 pp.
Farrell, Aided Navigation GPS with High Rate Sensors, Electronic Engineering, McGraw-Hill, 0-07-149329-8, 2008, 553 pp. (Applicant points out, in accordance with MPEP 609.04(a), that the year of publication, 2008, is sufficiently earlier than the effective U.S. filing date, so that the particular month of publication is not in issue.).
Feiner et al., "A Touring Machine: Prototyping 3D Mobile Augmented Reality Systems for Exploring the Urban Environment," Research Gate, Dec. 1997, 10 pp.
Felzenszwalb et al., "Distance Transforms of Sampled Functions," Theory of Computing, vol. 8, Sep. 2, 2012, 15 pp.
Harris et al., "A Combined Corner and Edge Detector," Proceedings of the Fourth Alvey Vision Conference, 5 pp. (Applicant points out, in accordance with MPEP 609.04(a), that the year of publication, 1988, is sufficiently earlier than he effective U.S. filing date, so that the particular month of publication is not in issue.).
Laina et al., "Deeper Depth Prediction with Fully Convolutional Residual Networks," IEEE International Conference on 3D Vision, Jun. 2016, 12 pp.
Levinson et al., "Robust Vehicle Localization in Urban Environments Using Probabilistic Maps," IEEE International Conference on Robotics and Automation, May 3-8, 2010, 7 pp.
Luo et al., "Geotagging in Multimedia and Computer Vision—A Survey," Multimedia Tools and Applications, vol. 51, Issue 1, Jan. 2011, 19 pp.
Mastin et al., "Automatic Registration of LIDAR and Optical Images of Urban Scenes," Conference on Computer Vision and Pattern Recognition IEEE, Jun. 20-25, 2009, 8 pp.
Matei et al., "Image to LIDAR Matching for Geotagging in Urban Environments," IEEE Workshop on Applications of Computer Vision, Jan. 15-17, 2013, 8 pp.
Menozzi et al., "Development of Vision-aided Navigation for a Wearable Outdoor Augmented Reality System," IEEE Position, Location, and Navigation Symposium, PLANS 2014, May 5-8, 2014, 13 pp.
Mourikis et al., "A Multi-State Constraint Kalman Filter for Vision-aided Inertial Navigation," IEEE International Conference on Robotics and Automation, Apr. 10-14, 2007, 8 pp.
Mur_Artal et al., "ORB-SLAM: a Versatile and Accurate Monocular SLAM System," IEEE Transactions on Robotics, Aug. 24, 2015, 18 pp.
Newcombe et al., "DTAM: Dense Tracking and Mapping in Real-Time," International Conference on Computer Vision, Nov. 6-13, 2011, 8 pp.
Nister, "Preemptive RANSAC for Live Structure and Motion Estimation," Proceedings of the Ninth International Conference on Computer Vision, Oct. 13-16, 2003, 8 pp.
Oskiper et al., "Multi-sensor navigation algorithm using monocular camera, IMU and GPS for large scale augmented reality," ResearchGate, Nov. 2012, 11 pp.
Park., "Augmented Reality for Collision Warning and Path Guide in a Vehicle," VRST'15, ACM, Nov. 13-15, 2015, 1 pp.
Tai et al., "Convolutional Neural Networks with Low-Rank Regularization," Computer Vision and Pattern Recognition Machine Learning, published online Cornell University Library, Nov. 19, 2015, 11 pp.
Arth et al., "Instant Outdoor Localization and SLAM Initialization from 2.5D Maps," IEEE Transactions on Visualization and Computer Graphics, Nov. 2015, 10 pp.
Chiu et al., "Constrained Optimal Selection for Multi-Sensor Robot Navigation Using Plug-and-Play Factor Graphs," IEEE International Conference on Robotics and Automation, May 31-Jun. 7, 2014, 8 pp.
Murali et al., "Utilizing Semantic Visual Landmarks for Precise Vehicle Navigation," IEEE 20th International Conference on Intelligent Transportation Systems, Oct. 16-19, 2017, 8 pp.

(56) References Cited

OTHER PUBLICATIONS

U.S. Appl. No. 16/163,273, by SRI International. (Inventors: Chiu et al.), filed Oct. 17, 2018.
Carlone et al., "Eliminating conditionally independent sets in factor graphs: A unifying perspective based on smart factors," in Proc. IEEE International Conference on Robotics and Automation (ICRA' 14), Jun. 2014, pp. 4290-4297.
Carlone et al., "Lagrangian Duality in 3D SLAM: Verification Techniques and Optimal Solutions," Jul. 20, 2015, 10 pp.
Chiu et al., "Sub-Meter Vehicle Navigation Using Efficient Pre-Mapped Visual Landmarks," in Proc. IEEE International Conference on Intelligent Transportation Systems (ITSC 16), Nov. 2016, 8 pp.
Dellaert, "Square Root SAM: Simultaneous Localization and Mapping via Square Root Information Smoothing," The International Journal of Robotics Research, vol. 25, No. 12, Dec. 2006, 23 pp.
Folkesson et al., "Closing the loop with graphical slam," IEEE Transactions on Robotics, vol. 23, pp. 731-741, Aug. 2007.
Folkesson et al., "Graphical SLAM—a Self-Correcting Map," in Proc. IEEE International Conference on Robotics and Automation (ICRA'04), Apr. 2004, pp. 383-390.
Forster et al., "IMU Preintegration on Manifold for Efficient Visual-Inertial Maximum-a-Posteriori Estimation," Jan. 2015, 10 pp.
Huang et al., "An Observability-Constrained Sliding Window Filter for SLAM," Mars Lab, Technical Report 2011-0001, Feb. 2011, 15 pp.
Indelman et al., "Information Fusion in Navigation Systems via Factor Graph Based Incremental Smoothing," Robotics and Autonomous Systems, vol. 61, Aug. 2013, 37 pp.
Johannsson et al., "Imaging sonar-aided navigation for autonomous underwater harbor surveillance," in Proc. IEEE/RSJ International Conference on Intelligent Robots and Systems (IROS' 10), Oct. 2010, pp. 4396-4403.
Kaess et al., "Concurrent Filtering and Smoothing," in Intl. Conf. on Information Fusion (FUSION), Jan. 2012, 8 pages.
Kaess et al., "iSAM2: Incremental smoothing and mapping using the Bayes tree," Intl. J. of Robotics Research, vol. 31, Feb. 2012, 19 pp.
Kaess et al., "The Bayes Tree: An Algorithmic Foundation for Probabilistic Robot Mapping," in International Workshop on the Algorithmic Foundations of Robotics (W AFR' 10), Dec. 2010, 16 pages.
Koller et al., "Probabilistic Graphical Models: Principles and Techniques," The MIT Press, 2009, 16 pp. (Applicant points out, in accordance with MPEP 609.04(a), that the year of publication, 2009, is sufficiently earlier than the effective U.S. filing date, so that the particular month of publication is not in issue.).
Konolige et al., "FrameSLAM: From Bundle Adjustment to Real-Time Visual Mapping," IEEE Transactions on Robotics, vol. 24, No. 5, Oct. 2008, 12 pp.
Konolige, "Large-Scale Map-Making," AAAI National Conference on AI (AAAI'04), pp. 457-463, Jul. 2004.
Kschischang et al., "Factor graphs and the Sum-Product algorithm," IEEE Transactions on Information Theory, Jul. 27, 1998, 76 pp.
Larsson et al., "A Multilevel Relaxation Algorithm for Simultaneous Localization and Mapping," IEEE Transactions on Robotics, May 2005, 12 pp.
Li et al., "Vision-aided Inertial Navigation for Resource-constrained Systems," International Conference on Intelligent Robots and Systems, Oct. 7-12, 2012, 7 pp.
Lu et al., "Globally Consistent Range Scan Alignment for Environment Mapping," Autonomous Robots, Kluwer Academic Publishers, vol. 4, Issue 4, pp. 333-349, Oct. 1997.
Lupton et al., "Visual-inertial-aided navigation for High-Dynamic Motion in Built Environments without Initial Conditions," IEEE Transactions on Robotics, vol. 28, pp. 61-76, Feb. 2012.
Ni et al., "Tectonic SAM: Exact, Out-of-Core, Submap-Based SLAM," IEEE International Conference on Robotics and Automation, May 2007, 8 pp.
Oskiper et al., "Stable Vision-Aided Navigation for Large-Area Augmented Reality," Mar. 2011, 8 pp.
Ranganathan et al., "Loopy SAM," in International Joint Conference on Artificial Intelligence (IJCAI'07), Jan. 2007, pp. 2191-2196.
Rao et al., "On Fusers that Perform Better than Best Sensor," IEEE Transactions on Pattern Analysis and Machine Intelligence, vol. 23, No. 8, Aug. 2001, 6 pp.
Roumeliotis et al., "Stochastic Cloning: A generalized framework for processing relative state measurements," Proceedings of the 2002 IEEE International Conference on Robotics & Automation, May 2002, 8 pp.
Julier et al., "A Counter Example to the Theory of Simultaneous Localization and Map Building," Proceedings 2001 ICRA IEEE International Conference on Robotics and Automation May 21-26, 2001, 7 pp.
Julier et al., "A New Approach for Filtering Nonlinear Systems," Proceedings of the American Control Conference, Jun. 1995, 5 pp.
Shamaiah et al., "Greedy sensor section: leveraging submodularity," n Proc. IEEE Intl. Conf. on Decision and Control (CDC), Dec. 15-17, 2010, 6 pp.
Sibley et al., "Sliding Window Filter with Application to Planetary Landing," Journal of Field Robotics, Jun. 21, 2010, 24 pp.
Smith et al., "Approaches to Multisensor Data Fusion in Target Tracking: A Survey," IEEE Transactions on Knowledge and Data Engineering, vol. 18, No. 12, Dec. 2006, 15 pp.
Strasdat, "Which Landmark is Useful? Learning Selection Policies for Navigation in Unknown Environments," IEEE International Conference on Robotics and Automation, May 12-17, 2009, 6 pp.
Sukumar et al., "Sensor Selection Using Information Complexity for Multi-Sensor Mobile Robot Localization," in Proc IEEE Intl. Conf. on Robotics and Automation (ICRA), Apr. 10-14, 2007, 7 pp.
Tardif et al., "A New Approach to Vision-Aided Inertial Navigation," IEEE/RSJ International Conference on Intelligent Robots and Systems, Oct. 18-22, 2010, 8 pp.
Triggs et al., "Bundle Adjustment—A Modern Synthesis," Vision Algorithms '99, LNCS, 75 pp. Lecture Notes in Computer Science, vol. 1883, pp. 298-375, Jan. 2000.
Trinh et al., "A General Approach to Online Sensor Calibration for Navigation Using Factor Graphs," Institute of Navigation International Technical Meeting (ION' 13), Jan. 2013, 9 pp.
Van Der Merwe et al., "Sigma-point Kalman Filters for Nonlinear Estimation and Sensor Fusion: Applications to Integrated Navigation," in Proc. AIAA Guidance, Navigation and Control Conference, Aug. 2004, 31 pp.

\* cited by examiner

AUGMENTING REALITY USING SEMANTIC SEGMENTATION

This application claims the benefit of U.S. Provisional Application No. 62/544,674, filed Aug. 11, 2017, which is hereby incorporated by reference in its entirety.

TECHNICAL FIELD

This disclosure generally relates to augmented reality.

BACKGROUND

Augmented reality driving systems in vehicles may be used to provide simulated visual information mixed with a live video feed of a user's real view. In some examples, an augmented reality driving system uses three-dimensional (3D) scanning data obtained using Light Detection and Ranging (LIDAR) sensors and geo-referenced data obtained using a global positioning system (GPS) device to estimate a 3D position and 3D orientation of the vehicle. Augmented reality driving systems may be used to provide increased situational awareness to a vehicle driver or operator. For example, augmented navigation systems may provide benefits to military training, road traveling, or driver navigation, or autonomous navigation.

SUMMARY

In general, the disclosure describes techniques for augmenting a reality captured by an image capture device. In one example, a system includes an image capture device that generates a two-dimensional frame at a local pose. The system further includes a computation engine executing on one or more processors that queries, based on an estimated pose prior, a reference database of three-dimensional mapping information to obtain an estimated view of the three-dimensional mapping information at the estimated pose prior. The computation engine processes the estimated view at the estimated pose prior to generate semantically segmented sub-views of the estimated view. The computation engine correlates, based on at least one of the semantically segmented sub-views of the estimated view, the estimated view to the two-dimensional frame. Based on the correlation, the computation engine generates and outputs data for augmenting a reality represented in at least one frame captured by the image capture device. In some examples, the computation engine generates, based on the correlation, a scene representation at the local pose. In some examples, the computation engine generates, based on the correlation, an estimate of the local pose that includes at least one of a position or an orientation at the local pose. In some examples, the computation engine generates, based on the correlation, an estimate of a depth of an object in the two-dimensional frame.

In one example of the techniques of the disclosure, a system includes: an image capture device configured to generate a two-dimensional frame at a local pose; and a computation engine executing on one or more processors and configured to query, based on an estimated pose prior, a reference database of three-dimensional mapping information to obtain an estimated view of the three-dimensional mapping information at the estimated pose prior, wherein the computation engine is further configured to process the estimated view at the estimated pose prior to generate semantically segmented sub-views of the estimated view, wherein the computation engine is further configured to correlate, based on at least one of the semantically segmented sub-views of the estimated view, the estimated view to the two-dimensional frame, and wherein the computation engine is further configured to, based on the correlation, generate and output data for augmenting a reality represented in at least one frame captured by the image capture device.

In another example of the techniques of the disclosure, a method includes: receiving, by a computation engine executing on one or more processors and from an image capture device, a two-dimensional frame at a local pose; querying, by the computation engine and based on an estimated pose prior, a reference database of three-dimensional mapping information to obtain an estimated view of the three-dimensional mapping information at the estimated pose prior; processing, by the computation engine, the estimated view at the estimated pose prior to generate semantically segmented sub-views of the estimated view; correlating, by the computation engine and based on at least one of the semantically segmented sub-views of the estimated view, the estimated view to the two-dimensional frame; generating, based on the correlation, data for augmenting a reality represented in at least one frame captured by the image capture device; and outputting the data.

In another example of the techniques of the disclosure, a non-transitory computer-readable medium includes instructions that, when executed, cause one or more processors to execute a computation engine configured to: receive, from an image capture device, a two-dimensional frame at a local pose; query, based on an estimated pose prior, a reference database of three-dimensional mapping information to obtain an estimated view of the three-dimensional mapping information at the estimated pose prior; process the estimated view at the estimated pose prior to generate semantically segmented sub-views of the estimated view; correlate, based on at least one of the semantically segmented sub-views of the estimated view, the estimated view to the two-dimensional frame; generate, based on the correlation, data for augmenting a reality represented in at least one frame captured by the image capture device; and output the data.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
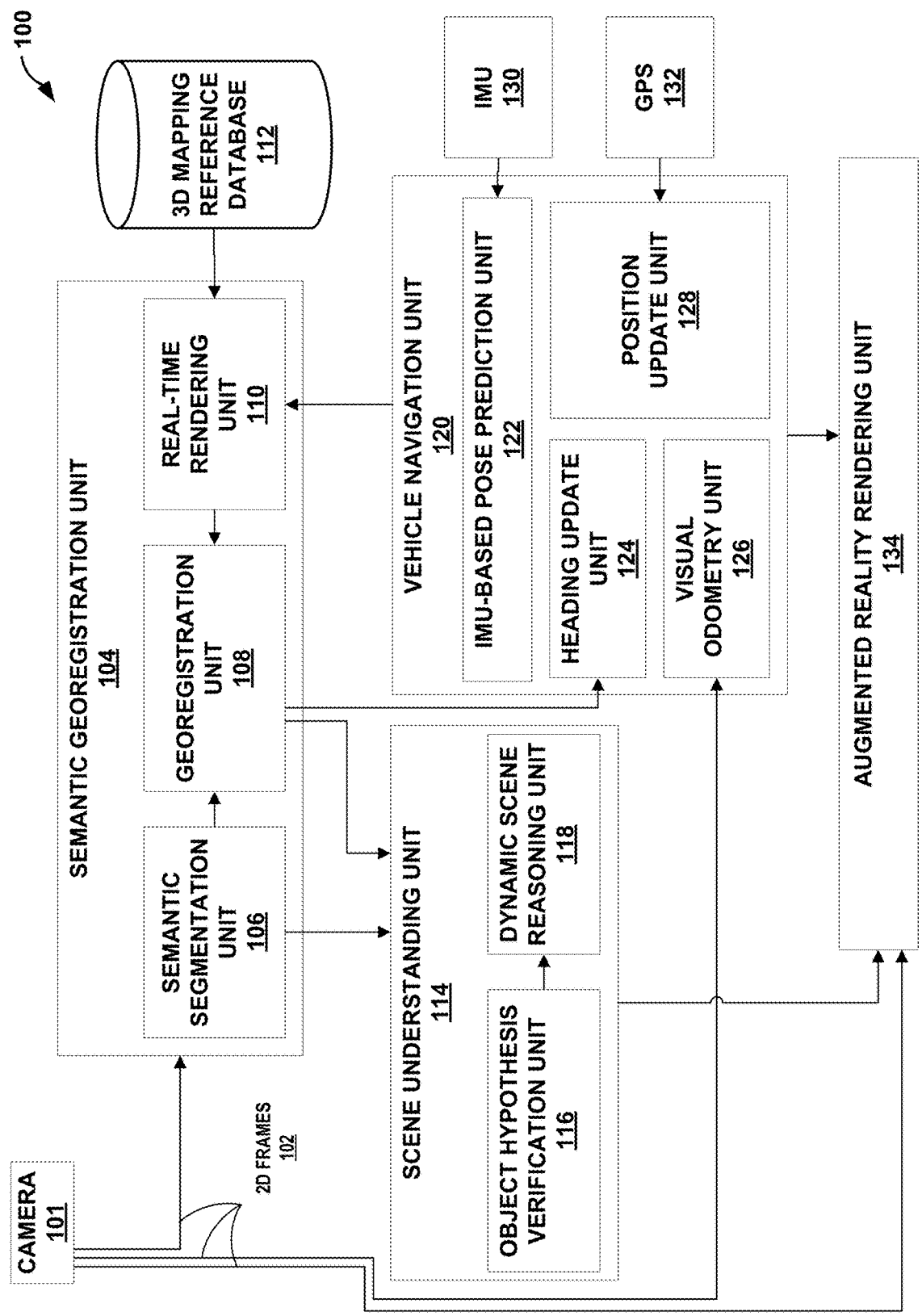
FIG. 1 is a block diagram illustrating an example system for augmenting a reality captured by an image capture device in accordance with the techniques of the disclosure.

Techniques are disclosed herein for augmenting a reality captured by an image capture device. In one example, the techniques of the disclosure use semantic information to register two-dimensional (2D) ground video frames to the world using three-dimensional (3D) mapping information, such as aerial georeferenced LIDAR data. This georegistration process fulfills the demanding requirements for augmented reality driving systems by improving the precision of global heading measurements, as one example, or providing a rendered depth map for each frame, as another example. In some cases, the global heading measurements may be fused with other sensors to continuously, precisely estimate the 6 degrees-of-freedom global pose of a vehicle or other system. The techniques of the disclosure may also estimate absolute depth values for dynamic objects based on the rendered depth map and update the rendered depth map to reflect scene changes over time. The techniques disclosed herein may consequently be used to improve navigation accuracy and/or depth map quality for augmented reality driving, vehicle navigation, and other applications.

Augmented reality for advanced driving assistance systems or autonomous cars may improve road travel experiences. Augmented reality may provide situation awareness, by offering simulated visual information mixed with the user's real view. For example, augmented reality may identify a front moving pedestrian and show time-to-collision warning for a driver to avoid accidents. Augmented reality may also serve as a tour guide to passengers through display devices, such as by highlighting a famous building in the real world.

However, current techniques do not fully fulfill two major requirements for such augmented reality driving systems: Estimating accurate 3D position and 3D orientation of the vehicle in a georeferenced coordinate system, and interpreting 3D dynamic scenes perceived from the camera installed on the vehicle. The conventional solution is to use costly and bulky 3D scanning sensors (such as a LIDAR sensor) with a global positioning system (GPS) device on the host ground vehicle. This approach builds 3D geo-referenced maps beforehand, and then geo-localizes the vehicle within these maps using LIDAR-to-LIDAR matching techniques. The 3D global scene obtained from the scanning sensor can then be projected to the image perceived from a camera for augmented reality applications.

Reasoning dynamic occlusion of new objects in the scene may be required for many augmented reality applications. However, previous approaches all have their limits. For example, depth sensors such as stereo cameras have a very short sensing range and may be unable to detect distant objects. Time of flight sensors also have a short sensing range, and typically do not work outdoors. 3D scanning sensors, such as LIDAR, may work outdoors but are expensive.

For approaches involving a monocular camera, simultaneous localization and mapping (SLAM) methods may perform real-time scene reconstruction during navigation. These methods estimate the depth map of the current image through small-baseline stereo matching over temporally nearby video frames. However, they generate relatively sparse depth maps and cannot recover the absolute scale of the reconstructed scene. They also cannot generate results for pure rotation motion due to the lack of translation for matching across frames.

Further, some approaches to depth prediction from a single image may use deep learning neural networks, such as Convolutional Neural Networks (CNNs) to learn an absolute scale from training examples and may construct a full depth map with predicted scale for a test image. However, these depth maps lack shape details and tend to be locally blurred. Their long computation time also does not satisfy the requirements for real-time augmented reality applications.

Furthermore, a robot or autonomous system navigating from point A to point B must plan a route and avoid obstacles along the way. In some examples, a robot performs planning by using 3D maps and detecting and locating obstacles along the way. The 3D sensing is typically done using LIDAR or stereo cameras. The stereo cameras have a short range and typically do not sense the location of obstacles more than 10-15 m from the platform. Using stereo, however a dense depth map can be constructed. The LIDaR sensors are expensive and provide sparse depth.

In accordance with the techniques of the disclosure, semantic information is extracted from a monocular video camera using a pretrained deep learning network, to register each 2D video frame with 3D reference data in a georeferenced coordinate system. In some examples, the 3D reference data is acquired using an airborne LIDAR sensor and annotated in world coordinate beforehand. The 2D video frame captured from the ground vehicle may be georegistered within a 2D rendered image rendered from 3D reference data. In some examples, the 2D rendered image is composed to cover a viewpoint range predicted by a vehicle navigation module.

A system according to the present disclosure may infer dynamic occlusion for objects based on semantic segmentation using a deep learning network and may recover the depth of objects with absolute scale by comparing them to 2.5D rendered scene images generated from the 3D reference data. Due to recent advances with deep learning, semantic segmentation on video frames may be performed with high accuracy. The techniques of the disclosure may allow for improved computational speed of semantic segmentation, so that a full high-resolution depth map may be generated for each input image frame from 10 Hz videos or other frame rates.

FIG. 1 is a block diagram illustrating an example system 100 for augmenting a reality captured by an image capture device in accordance with the techniques of the disclosure. System 100 includes camera 101, 3D mapping reference database 112, inertial measurement unit (IMU) 130, GPS 132, semantic georegistration unit 104, scene understanding unit 114, and vehicle navigation unit 120.

System 100 may use GPS 132, IMU 130, and one or more compass sensors (not depicted) for navigation and to reduce the cost of navigational systems. In addition to a low-cost IMU, such as IMU 130, and a non-differential GPS, such as GPS 132, system 100 may integrate both local measurements and global observations from camera 101. In some examples, system 100 may improve navigation performance for ground vehicles that can move and turn at high speed. The global observations, which are derived from the semantic georegistration process performed by semantic georegistration unit 104, further enhance pose estimation (e.g., for the heading) of system 100 for augmented reality applications.

Camera 101 is an example of an image capture device that produces a plurality of two-dimensional (2D) frames 102 at a local pose of the camera 101, which may correspond to a local pose of system 100 to which camera 101 is attached. In some examples, camera 101 may be another type of image capture device that generates, for a scene, 2D or 3D images, may be a video camera, a laser scanner or other optical device that produces a stream of image data, a depth sensor that produces image data indicative of ranges for features within the environment, a stereo vision system having multiple cameras to produce 3D information, a Doppler radar, or other image capture device. In some examples, camera 101 is a ground monocular video camera. 2D frames 102 may represent two-dimensional images generated periodically, on-demand, as frames of a video stream, and so forth. 2D frames may be of various resolutions and generated in various formats that may be processed by units 104, 114, 134, 120 of system 100.

Semantic georegistration unit 104 registers each 2D frame 102 to the world using a 2.5D rendered image generated from 3D mapping reference data of 3D mapping reference database 112. As described herein, "2.5D" refers to the construction of a simulated 3D representation from a plurality of 2D projections. Semantic georegistration unit 104 contributes information to both vehicle navigation unit 120 and scene understanding unit 114 for augmented reality driving. Semantic georegistration unit 104 includes semantic segmentation unit 106, georegistration unit 108, and real-time rendering unit 110.

Semantic segmentation unit 106 processes the plurality of 2D frames 102 to generate a plurality of semantically segmented sub-views of 2D frames 102 at a local pose of system 100. For example, to generate the plurality of semantically segmented sub-views of a 2D frame at the local pose of system 100, semantic segmentation unit 106 may classify one or more pixels in each of 2D frames 102 as belonging to one or more objects. Each object includes an object type that corresponds to one of the semantically segmented sub-views. Semantic segmentation unit 106 applies, to each of the classified one or more pixels in each of 2D frames 102, a label corresponding to the object type. For example, the set of semantic classification labels to which pixels may be semantically labeled may include: Sky, Building, Pole, Road Marking, Road, Pavement, Tree, Sign Symbol, Fence, Vehicle, Pedestrian, and Bicycle. Thus, each semantically-segmented sub-view may contain only those pixels that are labeled with a particular class. For example, a first semantically segmented sub-view of a 2D frame 102 may include each pixel labeled with a "Sky" classification label, while a second semantically segmented sub-view of a 2D frame 102 may include each pixel labeled with a "Road" classification label, etc. Semantic georegistration unit 104 provides the plurality of semantically segmented sub-views of 2D frames 102 to scene understanding unit 114.

In some examples, semantic segmentation unit 106 uses a SegNet encoder decoder network to conduct semantic segmentation for each of 2D frames 102 and label each pixel for the input video sequences. In one example, the encoder-decoder network comprises 4 layers for both the encoder and the decoder, 7×7 convolutional layers, and 64 features per layer. In one example, semantic segmentation unit 106 processes each 2D frame 102 to label each pixel of the frame with a different semantic classification label that indicates, for each pixel, that the pixel is a pixel within an image of an object corresponding to the classification label. For example, the set of semantic classification labels to which pixels may be semantically labeled may include: Sky, Building, Pole, Road Marking, Road, Pavement, Tree, Sign Symbol, Fence, Vehicle, Pedestrian, and Bicycle. A pixel of a 2D frame 102 that is labeled with the classification label Tree is a pixel within an image of a tree within the 2D frame. In one example, the SegNet architecture may be used because of its available trained models for urban environments.

While in the foregoing examples, semantic segmentation unit 106 implements a modified version of SegNet, the techniques of the disclosure may be implemented using any pre-trained network capable semantically labeling image data, e.g., of generating dense segmentation labels on video frames. For example, semantic segmentation unit 106 may comprise an interconnected mesh of units or nodes that implement an artificial intelligence algorithm to perform pattern recognition and matching without task-specific programming. As a further example, semantic segmentation unit 106 may implement one or more of nearest neighbor, naïve Bayes, decision trees, linear regression, support vector machines, neural networks, k-Means clustering, Q-learning, temporal difference, deep adversarial networks, GANs, or other supervised, unsupervised, semi-supervised, or reinforcement learning algorithms to perform semantic segmentation of 2D or 3D image data as described herein.

Further, the original SegNet is not designed for real-time augmented reality applications. To decrease computation requirements, in one example, the SegNet model may be converted into a low rank approximation of itself to improve the efficiency of the model while still maintaining accuracy. In one example, the conversion is based on a method for convolution networks, with modifications to handle de-convolution layers in SegNet architecture.

In one example implementation, the segmentation time, which is the forward pass performance time of the SegNet model, is improved from 160 milliseconds to 89 milliseconds to process one image on a single NVIDIA K40 GPU. In another example, similar accuracy to an unmodified, pre-trained Seg-Net may be maintained by fine-tuning this low-rank approximation.

3D mapping reference database 112 comprises a reference database of 3D mapping information. In some examples, the 3D mapping information includes geo-referenced data obtained via an aerial LIDAR sensor. In other examples, the 3D mapping information includes geo-referenced data collected via traditional, ground collection methods. However, collecting data from the ground may be cumbersome because the mapping vehicle may need to be driven around the city and deal with traffic. In contrast, aerial collection can cover a larger area more quickly, and may obtain data with higher resolutions. However, due to drastic viewpoint changes and different modalities between ground- and aerial-collected data, the techniques as described herein may be used to match between 2D ground-based images and 3D aerial data.

Real-time rendering unit 110 produces 2.5D rendered images based on the predicted ground viewpoint from vehicle navigation unit 120 and, more particularly, from IMU-based pose prediction unit 122 in some instances. In some examples, real-time rendering unit 110 uses data from 3D mapping reference database 112, such as pre-collected aerial LIDAR data, to generate geo-referenced rendered images with proper depth and edge discontinuities, based on the given viewpoint. The viewpoint is given as a 3D global pose with possible heading range (uncertainty) predicted from vehicle navigation unit 120. For example, real-time rendering unit 110 uses the 3D mapping reference data of 3D mapping reference database 112 to generate one or more estimated views at an estimated pose prior of system 100 from 3D mapping reference database 112. A pose prior of system 100 refers to a previous pose, or position and orientation, of system 100. The estimated pose prior of system 100, as described herein, is an estimate of the pose prior of system 100 that is created by real-time rendering unit 110 using the 3D mapping reference data. In some examples, real-time rendering unit 110 uses knowledge of a prior position of system 100 and the 3D mapping reference data of 3D mapping reference database 112 to construct, from a plurality of 2D or 3D projections of the prior position of system 100, a simulated 3D representation of the estimated pose prior of system 100.

Without having to model the structures scanned by the aerial LIDAR, system 100 may render (using a graphics API such as OpenGL) a LIDAR point cloud from any arbitrary view, simulating the pose and parameters of a real camera. This is accomplished by rendering each point in the potentially sparse LIDAR collect as a sphere whose radius is a function of distance from the virtual camera and local point density. This technique produces a depth image with minimized holes, where the gaps are filled in by the adaptive radii of the spheres used to represent each point. The rendering process is made computationally efficient by the use of GPU parallel processing. The actual generation of the point spheres takes place on the GPU during the graphics API's fragment processing step. The generation of the spheres is accomplished on the fly and in a highly parallel manner.

Further, semantic georegistration unit 104 processes the one or more estimated views at the estimated pose prior of system 100 to generate semantically segmented sub-views of the estimated view at the pose prior. For example, to generate the plurality of semantically segmented sub-views of the estimated view, semantic segmentation unit 106 may classify one or more pixels in the estimated view at the pose prior as belonging to one or more objects. Each object includes an object type that corresponds to one of the semantically segmented sub-views. Semantic segmentation unit 106 applies, to each of the classified one or more pixels in the estimated view at the pose prior, a label corresponding to the object type. For example, the set of semantic classification labels to which pixels may be semantically labeled may include: Sky, Building, Pole, Road Marking, Road, Pavement, Tree, Sign Symbol, Fence, Vehicle, Pedestrian, and Bicycle. Thus, each semantically-segmented sub-view may contain only those pixels that are labeled with a particular class. For example, a first semantically segmented sub-view of the estimated view at the pose prior may include each pixel labeled with a "Sky" classification label, while a second semantically segmented sub-view of the estimated view at the pose prior may include each pixel labeled with a "Road" classification label, etc. Semantic georegistration unit 104 provides the plurality of semantically segmented sub-views of the estimated view at the pose prior to scene understanding unit 114.

In contrast to conventional techniques, georegistration unit 108 may perform efficient georegistration on each of 2D frames 102 to fulfill demanding requirements for augmented reality driving. Additionally, georegistration unit 108 may use the one or more estimated views at the estimated pose prior of system 100 to limit the range for faster registration.

In one example, georegistration unit 108 correlate an estimated view to a 2D frame 102. In one example, georegistration unit 108 correlates the estimated view to the 2D frame 102 by correlating at least one semantically segmented sub-view of the estimated view to at least one segmented sub-view of the 2D frame 102. For example, georegistration unit 108 is configured to optimize an alignment of the semantic segmentation of one or more estimated views at the estimated pose prior of system 100 with semantic segmentation of 2D frames 102. Because, in examples where 3D mapping reference database 112 includes 3D aerial LIDAR data, the flight altitude during aerial data collections is high, there are may be fewer points sampled from vertical surfaces due to occlusions. Further, top surfaces of solid objects, such as roof of buildings, may be sampled with denser points in LIDAR data. To exploit these dense sampled points, georegistration unit 108 may derive and to use skyline features from video images for georegistration. Furthermore, by increasing the height of camera 101 from system 100 (e.g., such as by using a camera with a pole on top of a ground vehicle), a skyline in a scene may be easier to observe.

For example, georegistration unit 108 correlates an estimated view to a 2D frame 102 to generate a scene representation at the local pose. In some examples, georegistration unit 108 correlates an estimated view to a 2D frame 102 to generate an estimate of a local pose at the 2D frame 102. In further examples, georegistration unit 108 correlates an estimated view to a 2D frame 102 to generate an estimate of a depth of an object in the two-dimensional frame scene representation at the local pose. In one example, georegistration unit 108 correlates the estimated view to the 2D frame 102 by correlating at least one semantically segmented sub-view of the estimated view to at least one segmented sub-view of the 2D frame 102. In some examples, georegistration unit 108 correlates the estimated view to the 2D frame 102 by correlating one or more pixels in the estimated view classified as having a "skyline" label with one or more pixels in the 2D frame 102 classified as having the "skyline" label. In this fashion, georegistration unit 108 may correlate the estimated view to the 2D frame 102 by correlating a skyline present in the estimated view to a skyline present in the 2D frame 102.

For example, georegistration unit 108 may easily extract a skyline feature from a semantic segmentation of 2D frames 102 by separating a sky class and non-sky classes in the semantic segmentation. In some examples, the skyline feature is a horizon. Further, the skyline feature may also be directly derived from the one or more estimated views at the estimated pose prior by checking the depth information. Georegistration unit 108 applies a distance transform on the extracted binary skyline from the one or more estimated views at the estimated pose prior to generate a distance map D, in which pixel values are equal to the closest distance to the nearest skyline pixel.

Georegistration unit 108 treats the skyline extracted from input video frame 201 as a template T. In some examples, georegistration unit 108 uses a chamfer matching method, which handles possible skyline variations due to scene changes from past reference data, to determine a best alignment of template T over distance map D. In some examples, georegistration unit 108 uses a chamfer matching method as defined below:

$$\text{argmin}_k \sum_{n=1}^{N} T(i_n, j_n) D(i_n + k, j_n)$$

For each possible position on distance map D (shifted horizontally by parameter k in pixels), georegistration unit 108 sums up distance transform values for all N skyline pixels on template T. The position with the minimum summation of distance transform values represents best alignment.

Furthermore, in some examples, the height of camera 101 with respect to the ground is known and fixed. Estimates of, e.g., roll and pitch for the pose of camera 101, from IMU-based pose prediction unit 122 of vehicle navigation unit 120, are also reliable due to a gravity direction measured by IMU 130. Therefore, the chamfer matching process checks only 1D correlations (e.g., along horizontal axis) over distance map D. The horizontal shift k is also bounded by a heading uncertainty from an estimated pose prior. Typically, horizontal shift k is less than 10 degrees. Therefore, the alignment process becomes extremely fast in comparison to conventional systems. For the best alignment position of template T over distance map D, georegistration unit 108 defines a confidence value based on an overlapped percentage of skylines between template T and distance map D. If georegistration unit 108 determines that the confidence value is below a threshold (e.g., 75%), georegistration unit 108 treats the alignment position as a wrong match.

If georegistration unit 108 determines that the confidence value is above the threshold, georegistration unit 108 treats the alignment position as a successful match. Georegistration unit 108 uses the best registered horizontal position to define a global heading measurement for system 100 (assuming the heading of system 100 is the same as a view of camera 101) for vehicle navigation unit 120. In some examples, georegistration unit 108 sends the predicted region (based on a predicted heading from vehicle navigation unit 120) over the original rendered depth map to scene understanding unit 114, before the georegistration process begins.

Scene understanding unit 114 generates a rendered depth map of the 2D frames 102 at the local pose of system 100. In some examples, scene understanding unit 114 generates the rendered depth map from the geo-registration process described above. In other examples, scene understanding unit 114 generates the rendered depth map from another source of depth information. For example, scene understanding unit 114 may use an on-the-fly stereo depth map that only has nearby depth information. Scene understanding unit 114 may use any type of prior depth information to generate the rendered depth map of the 2D frames 102 at the local pose of system 100 as long as this prior depth information may be used to determine a reference frame. Scene understanding unit 114 propagates such prior depth information to generate a full depth map, including dynamic objects, based on semantic segmentations as described herein.

Scene understanding unit 114 recovers a depth of new objects and dynamic scene with absolute scale by comparing a georegistered 2D frame 102 and corresponding estimated view of the 3D mapping information at the estimated pose prior. Scene understanding unit 114 comprises object hypothesis verification unit 116 and dynamic scene reasoning unit 118. Scene understanding unit 114 generates a full depth map for augmented realty applications by verifying, via object hypothesis verification unit 116, each object hypothesis from semantic segmentation and respecting dynamic scene change from past data.

Scene understanding unit 114 performs 3D reasoning and predicts a full depth map for an 2D frame 102 by fusing semantic segmentation from the 2D frame 102 obtained from semantic segmentation unit 106 and a rendered depth map from georegistration unit 108. The rendered depth map provides useful information for the perceived 3D environment, but it may be outdated and does not reveal dynamic objects and temporal entities. In accordance with the techniques of the disclosure, object hypothesis verification unit 116 of scene understanding unit 114 verifies each object's class hypothesis from a segmentation result through 3D reasoning techniques and predicts the depth for each new object which does not exist in the rendered depth map. Further, dynamic scene reasoning unit 118 updates the rendered depth map to reflect 3D scene changes across time. In this way, scene understanding unit 114 generates depth maps that more accurately represent the real 3D environment perceived from camera 101 than conventional systems.

As described above, semantic segmentation unit 106 labels pixels of 2D frames 102 into a plurality of classes. For example, the plurality of classes may be sub-divided into sub-classes, e.g., sky, tree, ground (road marking, road, and pavement), dynamic objects (vehicle, pedestrian, and bicycle), and static objects (building, fence, sign symbol, and pole).

In some examples, object hypothesis verification unit 116 estimates the depth of an object in a 2D frame 102. For example, object hypothesis verification unit 116 may determine a reference plane in the 2D frame 102. Further, object hypothesis verification unit 116 identifies a candidate object in the 2D frame 102. Object hypothesis verification unit 116 estimates, based on at least one of the semantically segmented sub-views of the estimated view, a distance between the candidate object and the reference plane in the 2D frame 102. Object hypothesis verification unit 116 determines, based on the estimated distance, whether a probability that the candidate object is representative of the object exceeds a predetermined threshold. For example, in response to determining that the probability that the candidate object is representative of the object exceeds the predetermined threshold, object hypothesis verification unit 116 may conclude that the candidate object is in fact the object. Further, in response to determining that the probability that the candidate object is representative of the object exceeds the predetermined threshold, object hypothesis verification unit 116 estimates the depth of the object by fitting a 3D reference plane to the 2D frame 102. In some examples, the reference plane is a ground plane.

For example, object hypothesis verification unit 116 generates object candidates based on grouping segmented regions for dynamic objects and static objects. For each object candidate o, object hypothesis verification unit 116 assigns a true-positive flag t to the candidate region m for o. Object hypothesis verification unit 116 models the interaction between the object and the 3D ground plane G as p(t|m, G), which is the probability that the candidate is true positive given the candidate region m and the ground plane G. In some examples, object hypothesis verification unit 116 assumes the 3D ground plane is locally flat around system 100 and corresponds to ground semantic category on the image. The 3D ground plane may then be easily estimated since object hypothesis verification unit 116 knows all information on the camera matrix. As described herein, the 3D ground plane is denoted as G={n, h, f}, where n is the ground plane's normal, h is the distance between camera and ground, and f is focal length for the camera. Object hypothesis verification unit 116 then evaluates object candidates according to the following formula:

$$p(t=\text{true}|m,G) \propto p(t=\text{true}|d) = N(d;0,\sigma_d)$$

This formulation shows that object hypothesis verification unit 116 uses d, which is the distance between object to ground, to determine whether the candidate is true instead of using G directly. Object hypothesis verification unit 116 models p(t=true|d) as a Gaussian distribution with mean value 0 and sigma $\sigma_d$, which was learned from training data for the neural network.

To estimate d, assuming scene understanding unit 114 has some prior knowledge about the real scale c of the object class (such as a normal human height for a pedestrian), object hypothesis verification unit 116 may approximate the distance r between object to the camera from the object height I in the image and focal length f as follows:

$$r \cong \frac{c * f}{I}$$

The 3D coordinate O for object candidate o can then be approximated based on its 2D coordinate u and v as follows.

$$O \cong \frac{r}{\sqrt{\left(\frac{u}{f}\right)^2 + \left(\frac{v}{f}\right)^2 + 1}} \begin{pmatrix} \frac{u}{f} \\ \frac{v}{f} \\ \frac{f}{f} \\ 1 \end{pmatrix}$$

The distance d between object and the ground plane may then be computed based on the 3D coordinate O for object, the ground plane's normal n, and the distance between camera and ground h.

$$d = O^T n + h$$

Algorithm 1, set forth below, restates the depth estimation process for each object based on the hypothesis verification and the prior rendered depth map from Section 3.3. To estimate the object depth, object hypothesis verification unit 116 propagates absolute depth values from the rendered ground plane to the object through the intersection between them. Simple 3D class models are used for depth propagation.

---
ALGORITHM 1: Depth Estimation for Dynamic Objects
---
Input: A rendered depth map of an image with its semantic segmentation
Output: Depth estimation for objects in this video frame
  1. Group segmented object regions;
  2. Form object candidates based on these regions;
  3. for each object hypothesis do
     Compute distance between the object and ground plane (Eqn.7-9);
     Calculate true-positive probability p for this object (Eqn.6);
     if (p > threshold);
        then
           Estimate object depth by fitting 3D class model on ground plane;
        end
     end
---

Dynamic scene reasoning unit 118 updates the rendered depth map to reflect scene changes. For example, the current perceived scene may change across time for the same environment. The reference data may be outdated and does not reveal new information. For example, trees may grow and there may be new poles which do not exist before. Pedestrians can also appear or move out of the scene. Therefore, in addition to depth estimation for object categories, dynamic scene reasoning unit 118 updates the rendered depth map to reflect scene changes for other categories, for example, sky, tree, and ground. Since the segmentation accuracy for these categories (especially sky) is very high, dynamic scene reasoning unit 118 accepts all segmented labels for these categories to update the depth map. For example, dynamic scene reasoning unit 118 assigns a depth value for sky pixels as infinity, while dynamic scene reasoning unit 118 assigns estimates to depth values for pixels of ground categories with respect to the 3D ground plane. As another example, for any pixel with a 'tree' label, if the rendered depth value is infinity (originally sky), dynamic scene reasoning unit 118 assigns a depth value by sampling nearby trees. After dynamic scene reasoning unit 118 estimates depth for new objects and changes to the scene, the final depth map for the input video frame can be used for augmented reality applications.

Vehicle navigation unit 120 comprises IMU-based pose prediction unit 122, heading update unit 124, visual odometry unit 126, and position update unit 128. Vehicle navigation unit 120 uses data received from IMU 130 and GPS 132 to generate estimates of a position or an orientation of system 100. In some examples, vehicle navigation unit 120 updates pose estimation at a camera frame rate (e.g., 10 Hz) and can provide predicted poses at an IMU rate (e.g., 100 Hz).

IMU 130 produces IMU data indicative of a dynamic motion of system 100. IMU 130 may, for example, detect a current rate of acceleration using one or more accelerometers as system 100 is translated, and detect changes in rotational attributes like pitch, roll and yaw using one or more gyroscopes. IMU 130 produces IMU data to specify the detected motion. In this way, IMU 130 provides proprioceptive information the movement and orientation of system 100 within the environment.

IMU-based pose prediction unit 122 receives IMU data from IMU 130 to generate a pose prediction for system 100. In some examples, the pose includes a prediction of an orientation of system 100. For example, the prediction of the orientation of system 100 may include a prediction of a pitch, roll, or yaw of system 100.

As used herein, navigation state of the ground vehicle at time i is defined as $x_i = \{p_i, v_i, b_i\}$. Each state x covers three kinds of nodes: the pose node p includes 3D translation t and 3D rotation R, the velocity node v represents 3D velocity in the world coordinate system, and b denotes sensor-specific bias block which are varied for different sensors. 3D rotation R represents the rotation from the world coordinate system to the local body's coordinate system, while the 3D translation t represents the position of the local coordinate system's origin in the world coordinate system. To simplify the notation, the disclosure assumes that all sensors have the same center, which is the origin of the body coordinate system (e.g., an origin of system 100).

A navigation state is created when a 2D frame 102 is received from camera 101. In some examples, a multi-state extended Kalman filter architecture [22] processes current and past navigation states inside a buffer. In one example, a multi-state extended Kalman filter comprises a buffer length of 4 seconds and marginalizes old states as the old states move out of the buffer.

In one example implementation, IMU 130 produces measurements at a much higher rate (100 Hz) than other sensors. IMU-based pose prediction unit 122 integrates these high-frequency IMU measurements and formulates them as an underlying motion model across two sequential navigation states. Denoting with $\alpha_i\text{-}1{:}i$ and $\omega_i\text{-}1{:}i$ all the accelerometer and gyroscope measurements collected between two consecutive navigation states (at time i−1 and i), an IMU motion constraint is formulated via integration of $\alpha_i\text{-}1{:}i$ and $\omega_i\text{-}1{:}i$:

$$x_i = m_g(x_{i-1}, \alpha_{i-1}, \alpha_{i-1:i})$$

wherein $m_9$ denotes the function integrating the accelerations and rotation rates $\alpha_i\text{-}1{:}i$ and $\omega_i\text{-}1{:}i$ starting from state $x_i\text{-}1$. The integration process is usually referred to as IMU mechanization and the subscript "g" in $m_g$ denotes the fact that the integration computes quantities in the global navigation frame.

This IMU motion model generates 6 DOF relative pose and corresponding velocity change between time i−1 and i. The model also tracks the IMU-specific bias as part of the state variables, assuming a random-walk model for the IMU bias evolution. This process replaces the system dynamics with the motion derived from IMU propagation, allowing for better handling of the uncertainty propagation through the whole system.

In some examples, video processing for a 2D frame 102 arriving at time i may not finished when the navigation state $x_i$ is created with the arrival of the video frame. The IMU motion model integrates all IMU readings between time i−1 and i and predicts a 6DOF pose at time i by propagating relative pose change from $x_i\text{-}1$. This approach provides the predicted pose at time i for use by real-time rendering unit 110, and the linearization point for navigation state $x_i$ which may be necessary to linearize and fuse GPS and visual measurements. Once the video processing for 2D frame 102 at time i is done, the multi-state extended Kalman filter fuses the visual measurements with the other sensor information and updates a navigation state $x_i$ to improve future predictions.

GPS 132 is a device that is capable of receiving information from one or more GPS satellites. Based on the received information, GPS 132 may calculate a geographical position of system 100. In some examples GPS 132 may calculate a latitudinal and longitudinal position of system 100. Position update unit 128 receives GPS information from GPS 132 to update a position of system 100. In some examples, GPS 132 is a non-differential GPS device. In some examples, vehicle navigation unit 120 updates an estimate of navigation states using measurements from GPS 132 and derived from 2D frames 102. GPS 132 reports a 3D position of system 100 as system 100 moves through the world coordinate system. GPS 132 directly updates a translation part t of the pose node for the navigation state.

Visual odometry unit processes 2D frames 102 to generate an estimate of a distance traveled by system 100. In some examples, for 2D frames 102, visual odometry unit 126 uses a Harris corner detector and a BRIEF descriptor, to detect and match visual point features across consecutive sequential frames. Visual odometry unit 126 also rejects feature outliers using pairwise epipolar constraints and RANSAC verification across frames. In one example implementation, an average processing time is 15 milliseconds to process around 850 features for an image size of 640 pixels by 480 pixels using a single core of an Intel i7 CPU running at 2.80 GHz. Visual odometry unit 126 uses accepted tracked features as measurements to update relative motion between navigation states $x_{i-1}$ and $x_i$.

Visual odometry unit 126 may also check consistency among GPS data from GPS 132 and measurements from 2D frames 102 for outlier rejection. Visual odometry unit 126 ensures that sequential measurements from the same sensor is consistent to a relative motion change predicted by IMU-based pose prediction unit 122. Visual odometry unit 126 verifies that both relative position change from sequential GPS readings from GPS 132 and relative motion estimated from 2D frames 102 track across frames.

Heading update unit 124 of vehicle navigation unit 120 uses visual data obtained from semantic georegistration unit 104 to generate estimates of a heading of system 100. The horizontal position of successful skyline registration determined by georegistration unit 108 may be used to define a global heading angle, or equivalently a yaw angle for a 2D frame 102 at time i. Heading update unit 124 models this global heading reading as a measurement which updates a rotation Ri of system 100 in the navigation state. In particular, heading update unit 124 converts a rotation matrix Ri to a corresponding roll, pitch, yaw representation according to the following model, which represents this measurement z using the function h for navigation state $x_i$ with measurement noise w:

$$z = h(x_i) + w = \text{yaw}(R_i) + w,$$

where yaw denotes a function that takes a 3D rotation as input and returns the corresponding yaw angle. During the update process in the multi-state Kalman filter, to introduce the linearized model, given a linearization point $\hat{R}_i$ for the current rotation, an equivalent model is defined below as:

$$z = h(x_i) + w = \text{yaw}(\hat{R}_i \exp(\theta_i)) + w,$$

where exp is the exponential map for the rotation group which converts a 3D vector in the tangent space at the identity into a rotation matrix, and $\theta_i \in \mathbb{R}^3$ is a rotation vector describing a rotation (also referred to as exponential coordinates). Note that the exponential coordinates $\theta_i$ may be included to describe small angular perturbations with respect to the linearization point $\hat{R}_i$. The linearized model may therefore be defined as:

$$\delta z = J \delta \theta_i + w, \quad J = \frac{\partial \text{yaw}}{\partial \theta_i}$$

Using the above model, the multi-state filter is able to use these global heading readings to directly correct a heading of system 100 at video frame rate, and further influences other variables (such as 3D position) through motion propagation within the filter.

Augmented reality rendering unit 134 receives an estimate of a position from vehicle navigation unit 120, object identification data from scene understanding unit 114, and the plurality of 2D frames 102. Augmented reality rendering unit 134 processes this data to generate an improved augmented reality driving system. For example, augmented reality rendering unit 134 may display, for presentation to a user, global heading measurements obtained from vehicle navigation unit 120 or generate a rendered depth map for the scene perceived from camera 101. By fusing these global heading measurements with data from other sensors, such as GPS 132 or IMU 130, an inertial measurement unit (IMU), augmented reality rendering unit 134 may continuously estimate precise 6 degrees of freedom (DOF) global pose of system 100. The techniques may also generate reliable IMU-based pose prediction to each incoming 2D frame 102 for low-latency augmented reality systems.

In one example, a system as described within was used to demonstrate improvements to navigation accuracy and depth map quality in two different driving scenarios. The first scenario (3.1 kilometers, 5.5 minutes) was performed using relatively high driving speed on country roads. The second scenario (5.08 kilometers, 12 minutes) was performed within large-scale urban environments which include a variety of buildings and traffic.

In one example, system 100 includes a low-cost non-differential GPS (e.g. GPS 132), a 100 Hz MEMS Microstrain GX4 IMU, and one 10 Hz front-facing monocular Point Grey camera (e.g., camera 101). High-precision differential GPS, which may also be installed on system 100, may be used to generate 6 DOF global pose (fused with IMU data from IMU 130) for system 100 as ground truth to evaluate georegistration precision and navigation accuracy of system 100. In some examples, all sensors are calibrated and triggered through hardware synchronization.

The global heading measurements from semantic georegistration unit 104 significantly improve the heading estimation of vehicle navigation unit 120. Note without georegistration, an estimated global pose (both heading and position) may be heavily influenced by GPS 132, which rarely reaches satisfactory accuracy in urban environments due to signal obstructions and multipath effects.

By fusing global heading measurements with other sensor measurements (such as with a non-differential GPS such as GPS 132, IMU 130, and feature tracks), the final heading estimation predicted by system 100 during the demonstration was even more accurate than the global heading measurement itself. For example, during scenario 1, the median heading error (0.4391 degree) from a final pose estimation was smaller than the median error (1.2944 degree) for heading measurements used (75% confidence) from semantic georegistration unit 104. Further, the final pose estimation was more accurate than a median error (0.4970 degree) for high-quality heading measurements (90% confidence).

Thus, a system as described herein may use global heading measurements not only to directly correct vehicle heading at video frame rate, but also to further influence other variables (such as position) through motion propagation within the multi-constraint filter. In some examples, system 100 may use terrain height from geo-referenced data generated by georegistration unit 108 to correct a height in an estimated view from an estimated pose prior. Therefore, in some examples, an error from an estimated position may accrue mainly from the horizontal direction. For example, the global heading measurement may be used to reduce 2D lateral error, which is along a left-right direction for the vehicle. In further examples, scene understanding unit 114 may construct a reasonable depth map, including dynamic objects and changed scenes, for each of 2D frames 102. Using these depth maps, system 100 may facilitate realistic augmented reality on driving scenarios.

Furthermore, a system as described herein may provide advantages to autonomous systems or for robot applications. For example, an autonomous system or robot may use semantic segmentation of video streams in accordance with the techniques disclosed herein. In some examples, such techniques may provide a method for an autonomous system or robot to compute dense depth of detected obstacles at long ranges from the platform. This long range depth estimating may be used by the robot to do path planning and obstacle avoidance for extended distance. Such techniques may allow for an autonomous system or robot to perform higher speed maneuvers or compute a route more efficiently than conventional systems.

Figure 2:
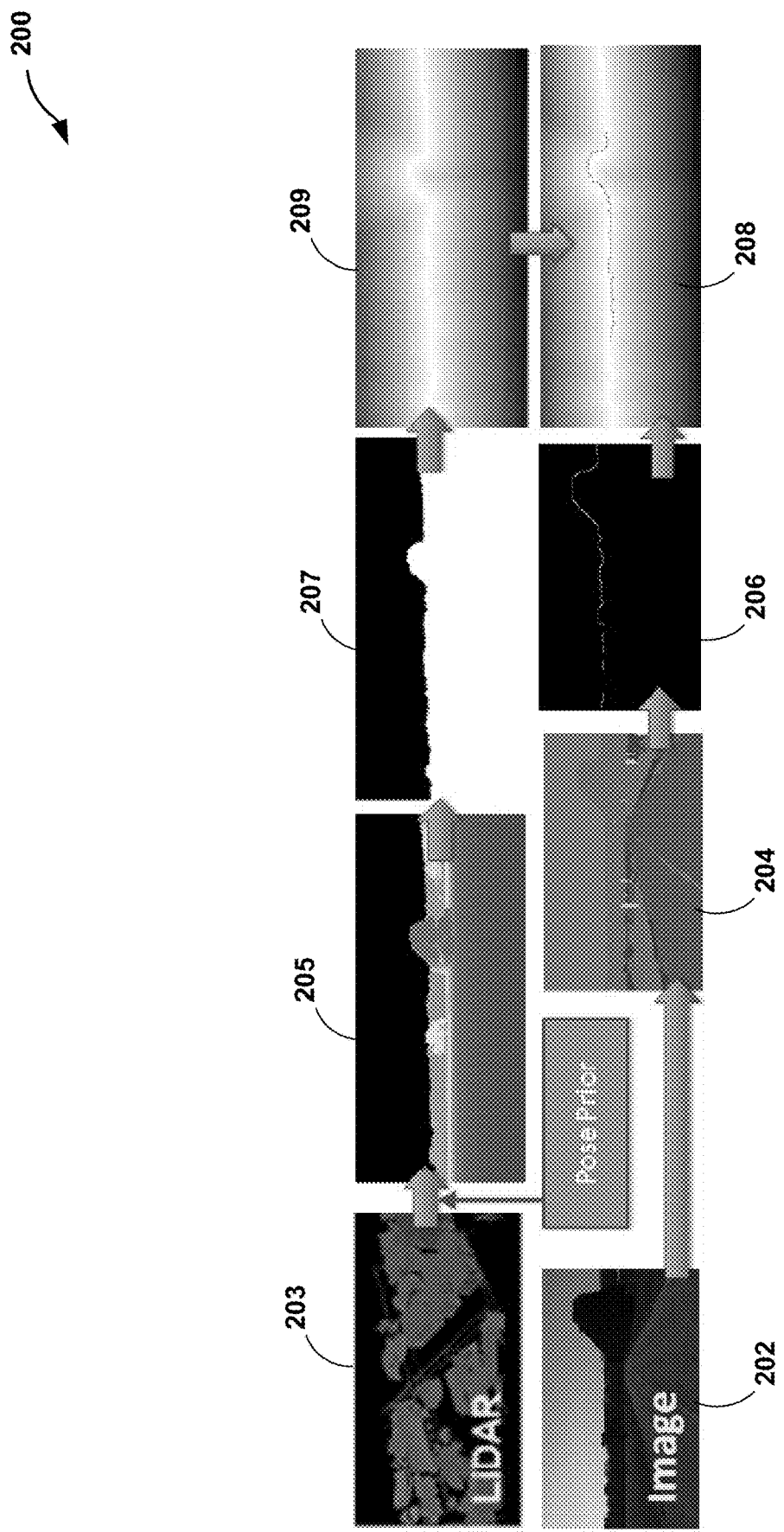
FIG. 2 is an illustration depicting an example semantic segmentation of images in accordance with the techniques of the disclosure.

FIG. 2 is an illustration 200 depicting an example semantic segmentation of images in accordance with the techniques of the disclosure. Semantic segmentation unit 106 performs semantic segmentation on input video frame 202 to generate semantically segmented sub-views 204 of input video frame 202. Scene understanding unit 114 processes the semantically segmented sub-views 204 to identify a horizon 206 in input video frame 202.

Semantic segmentation unit 106 processes 3D LIDAR data 203 to generate estimated view 205 at a pose prior of system 100. Semantic segmentation unit 106 performs semantic segmentation on estimated view 205 at the pose prior to generate semantically segmented sub-views 207 of the estimated view 205 at the pose prior. Scene understanding unit 114 processes the semantically segmented sub-views 207 to identify a horizon feature in horizon sub-view 209 in estimated view 205.

Georegistration unit 108 correlates a horizon sub-view of semantically segmented sub-view 206 in input video frame 202 to the horizon sub-view 209 of semantically segmented sub-views 207 in estimated view 205. Correlation 208 depicts the best alignment of horizon sub-view 206 in input video frame 202 to horizon sub-view 209 in estimated view 205. Navigation unit 120 uses the correlation between horizon sub-view 206 in input video frame 202 and horizon sub-view 209 in estimated view 205 to generate updates to a global heading estimate of system 100.

Figure 3:
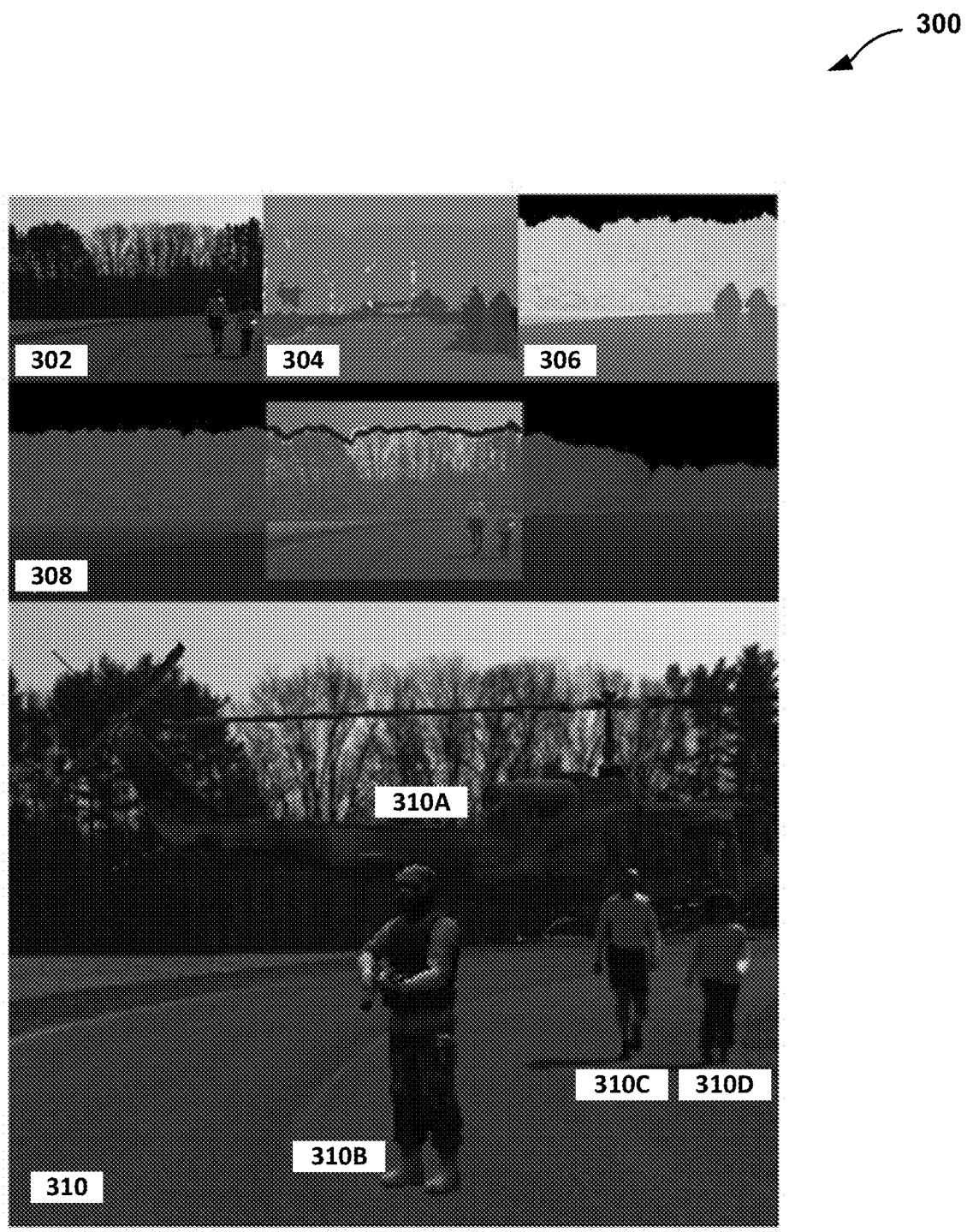
FIG. 3 is an illustration depicting an example augmented reality in accordance with the techniques of the disclosure.

FIG. 3 is an illustration 300 depicting an example augmented reality in accordance with the techniques of the disclosure. Illustration 300 depicts input video frame 302, semantic segmentation 304 of input video frame 302, and estimated view 306 of a pose prior of a vehicle. In the example of FIG. 3, estimated view 306 is a depth map.

Illustration 300 further depicts overlay 308 of georegistered input video frame 302 with a matched skyline overlaid upon estimated view 306 of the pose prior of the vehicle. Furthermore, illustration 300 depicts an example augmented reality image 310 that includes a virtual helicopter 310A, virtual soldier 310B, and two real pedestrians 310C and 310D.

Figure 4:
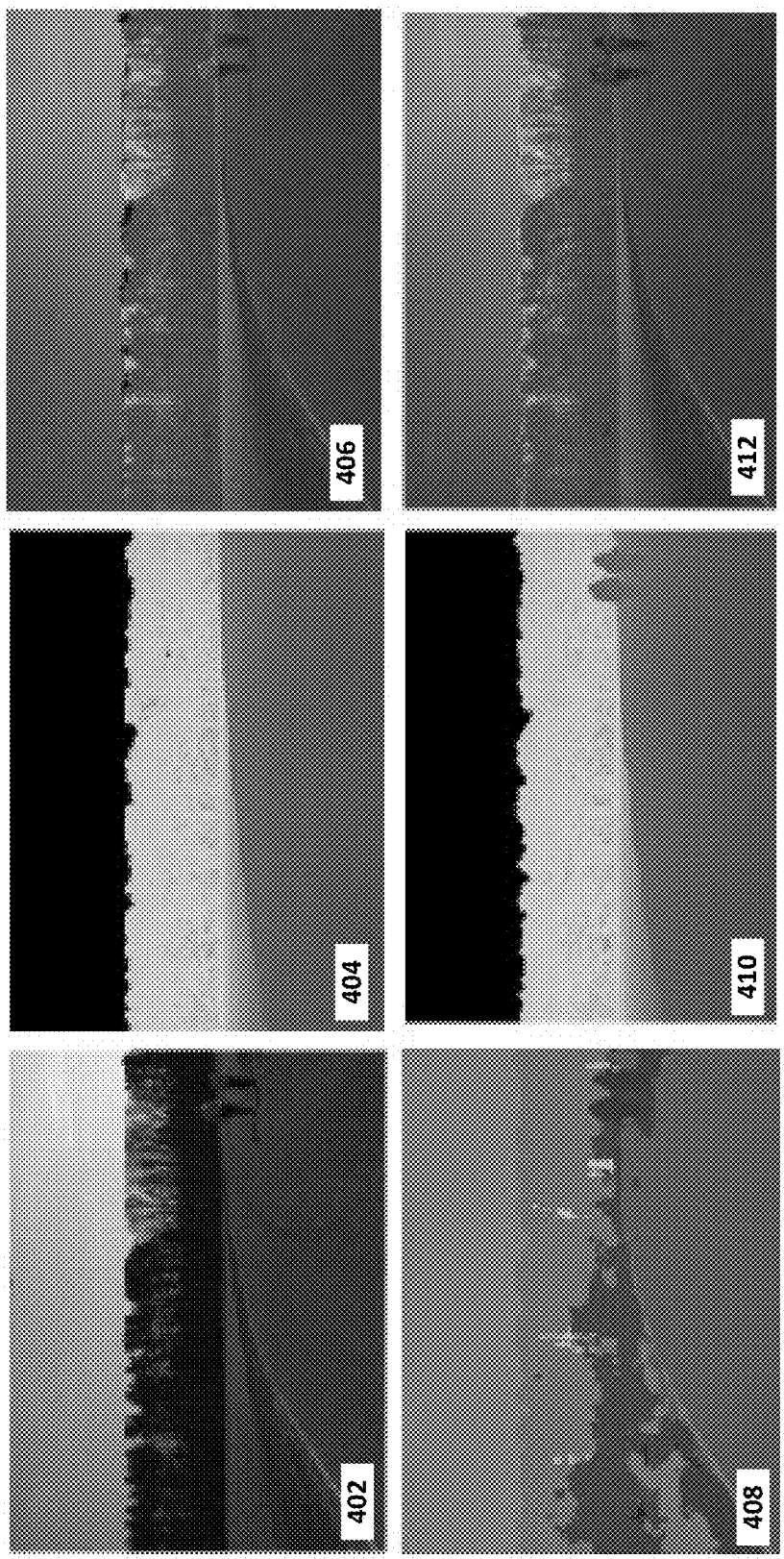
FIG. 4 is an illustration depicting example semantic segmentation of images in accordance with the techniques of the disclosure.

FIG. 4 is an illustration 400 depicting example semantic segmentation of images in accordance with the techniques of the disclosure. Illustration 400 depicts an input image frame 402, original rendered depth map 404, and an overlay 406 of input image frame 402 and original rendered depth map 404. Illustration 400 further depicts semantic segmentation 408 of input image frame 402, final rendered depth map 410, and a final overlay 412. In the example of FIG. 4, only two pedestrians pass verification by object hypothesis verification unit 116.

Figure 5:
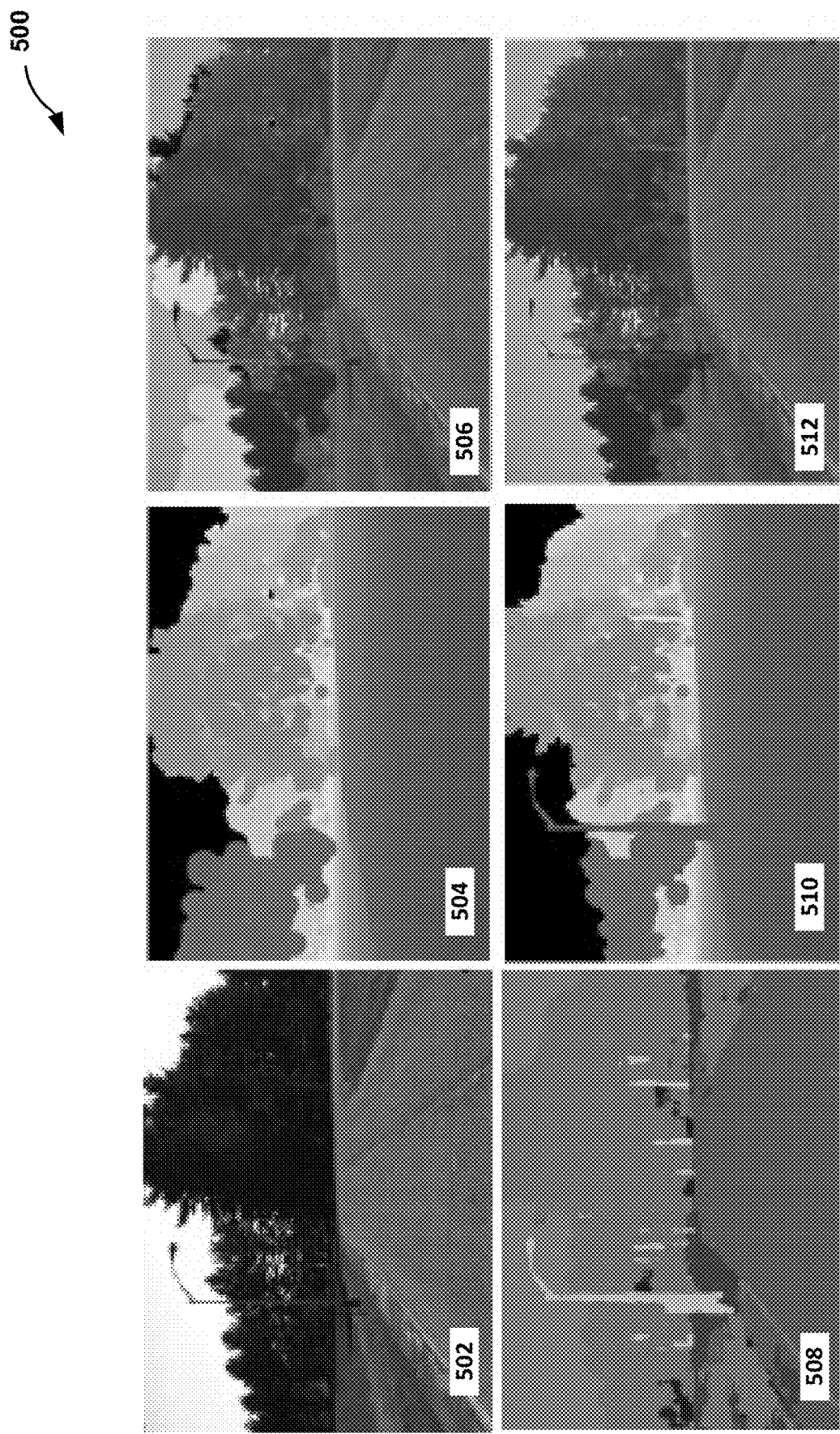
FIG. 5 is an illustration depicting an example object hypothesis verification and dynamic scene reasoning of images in accordance with the techniques of the disclosure.

FIG. 5 is an illustration depicting an example object hypothesis verification and dynamic scene reasoning of images in accordance with the techniques of the disclosure. Illustration 500 depicts an input image frame 502, original rendered depth map 504, and an overlay 506 of input image frame 502 and original rendered depth map 504. Illustration 500 further depicts semantic segmentation 508 of input image frame 502, final rendered depth map 510, and a final overlay 512. Note that input image frame 502 depicts new poles and tree height changes that are not present in original rendered depth map 504 that contains past (and outdated) reference data.

Figure 6:
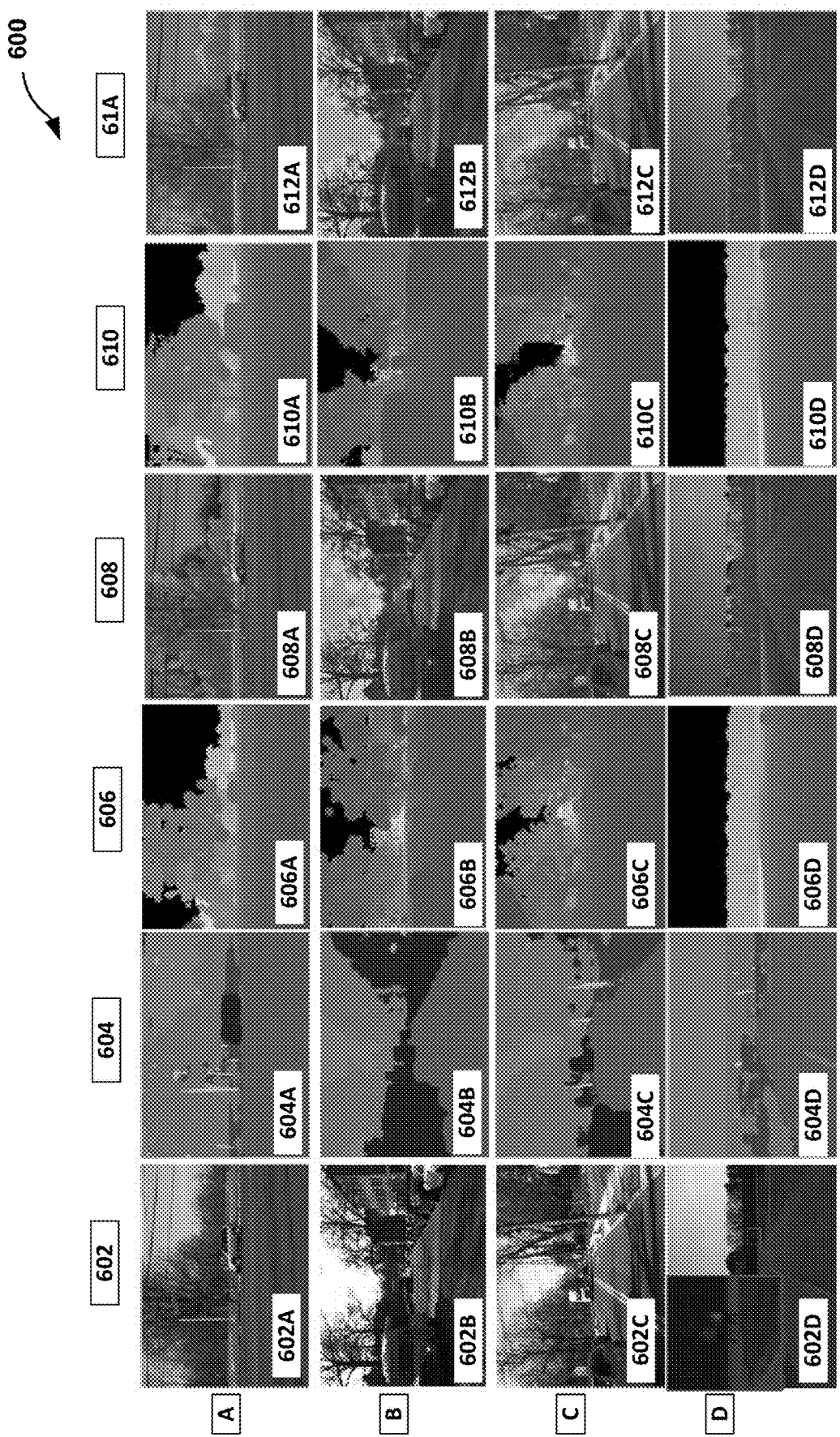
FIG. 6 is an illustration depicting example semantic segmentation of images in accordance with the techniques of the disclosure.

FIG. 6 is an illustration 600 depicting example semantic segmentation of images in accordance with the techniques of the disclosure. As depicted in FIG. 6, each sub-image of a respective row (e.g. rows A, B, C, and D) relate to a respective one of input image frames 602A, 602B, 602C, or 602D (collectively, "input image frames 602"). Further, as depicted in FIG. 6, each column 602, 604, 606, 608, 610, and 612 (e.g. rows A, B, C, and D) relate to a respective step for performing vision aided navigation in accordance with the techniques of the disclosure Illustration 600 depicts input image frames 602 of a local pose of a vehicle. Illustration 600 further depicts semantically segmentation 604A, 604B, 604C, and 604D of respective input image frames 602A, 602B, 602C, and 602D.

Illustration 600 further depicts rendered depth maps 606A, 606B, 606C, and 606D without scene understanding (collectively, "depth maps 606 without scene understanding") and overlays 608A, 608B, 608C, and 608D of input image frames 602 and depth maps 606 without scene understanding. Each of depth maps 606 without scene understanding depict an estimated view from a pose prior of the vehicle.

Illustration 600 further depicts final rendered depth maps 610A, 610B, 610C, and 610D with scene understanding (collectively, "final depth maps 610 with scene understanding") and final overlays 612A, 612B, 612C, and 612D of input image frames 602 and final depth maps 610 with scene understanding. System 100 is capable of detecting two far-away pedestrians and estimating their depth in final rendered depth map 610D and final overlay 612D.

Figure 7:
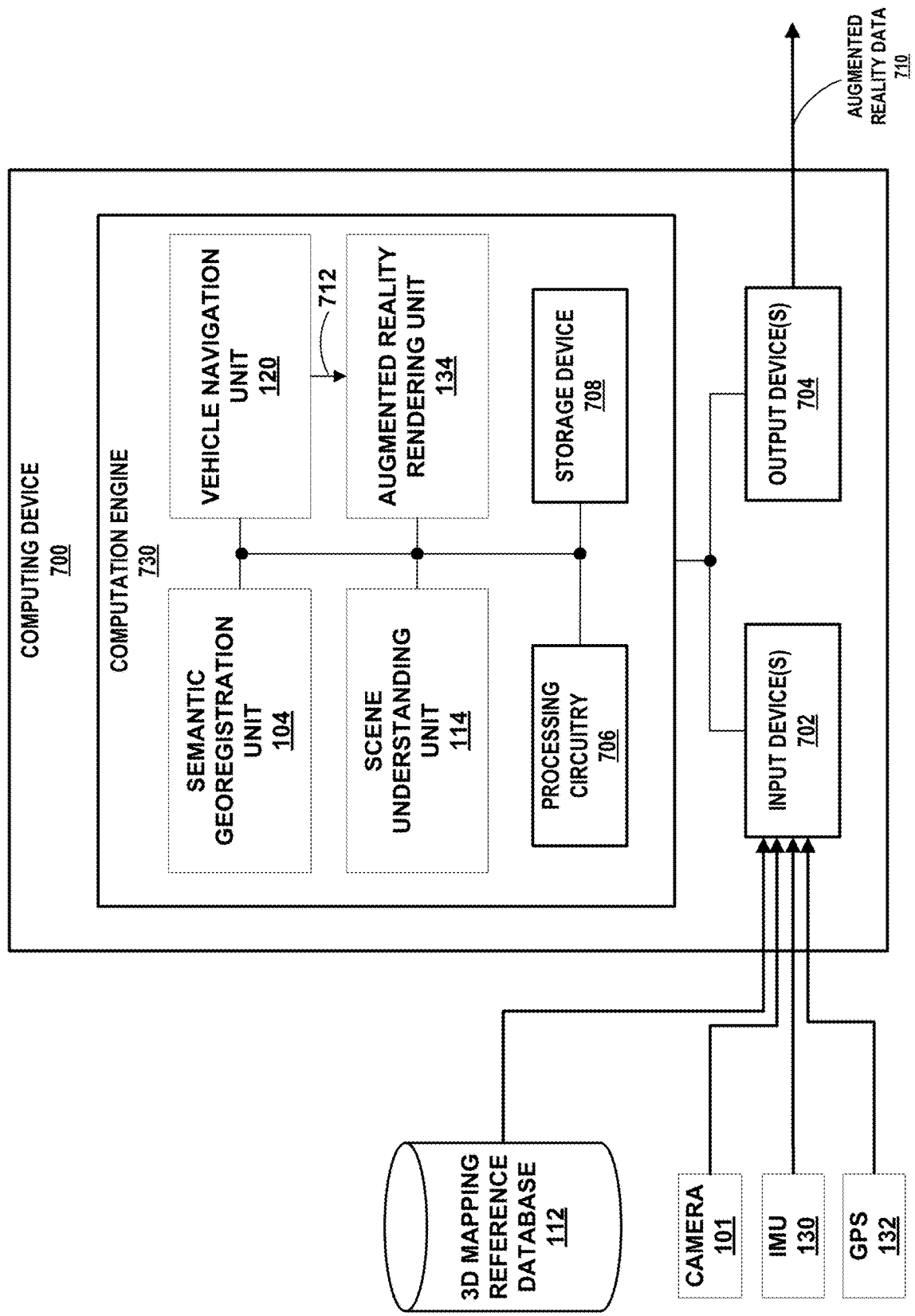
FIG. 7 is a block diagram illustrating an example computing device for vision-aided navigation using semantic segmentation of images in accordance with the techniques of the disclosure.

FIG. 7 is a block diagram illustrating an example computing device 700 for vision-aided navigation using semantic segmentation of images in accordance with the techniques of the disclosure. In the example of FIG. 7, computing device 700 includes computation engine 730, one or more input devices 702, and one or more output devices 704.

In the example of FIG. 7, computing device 700 may provide sensor input to computation engine 730 via one or more input devices 702. In some examples, the sensor input includes 3D mapping information from 3D mapping reference database 112, a 2D image frame from camera 101 that depicts scene at a local pose of a vehicle for computing device 700, IMU data from IMU 130, and/or GPS data from GPS 132. Input devices 702 may include hardware and/or software for establishing a connection with computation engine 730. For example, input devices 702 may communicate with computation engine 730 via a direct, wired connection, over a network, such as the Internet, or any public or private communications network, for instance, broadband, cellular, Wi-Fi, and/or other types of communication networks, capable of transmitting data between computing systems, servers, and computing devices. Input devices 702 may be configured to transmit and receive data, control signals, commands, and/or other information across such a connection using any suitable communication techniques to receive the sensor data. For example, input devices 702 and computation engine 730 may each be operatively coupled to the same network using one or more network links. The links coupling input devices 702 and computation engine 730 may be wireless wide area network link, wireless local area network link, Ethernet, Asynchronous Transfer Mode (ATM), or other types of network connections, and such connections may be wireless and/or wired connections.

Computation engine 730 includes semantic georegistration unit 104, scene understanding unit 114, vehicle navigation unit 120, and augmented reality rendering unit 134. Computation engine 730 may represent software executable by processing circuitry 706 and stored on storage device 708, or a combination of hardware and software. Such processing circuitry 706 may include any one or more of a microprocessor, a controller, a digital signal processor (DSP), an application specific integrated circuit (ASIC), a field-programmable gate array (FPGA), or equivalent discrete or integrated logic circuitry. Storage device 708 may include memory, such as random-access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

Computing device 700 or aspects thereof, such as computation engine 730 or select units thereof, may be located remote from a vehicle for which a local pose is being estimated. For example, a vehicle may include an attached camera 101 and upload 2D images via a wireless communication link to a cloud-based or other remote computing device 700 that estimates local poses of the vehicle based on the 2D images and 3D mapping reference database 112. An IMU 130 other unit of the vehicle may receive, via the wireless communication link, indications of the local pose estimated by the computing device 700 to update the position of the IMU 130.

In some examples, semantic georegistration unit 104 of computation engine 730 processes received image data to generate semantically segmented sub-views of the received image data. For example, semantic georegistration unit 104 processes the 2D image frame from camera 101 that depicts the local pose of the vehicle to generate semantically segmented sub-views of the 2D image frame at the local pose. Further, semantic georegistration unit 104 processes the 3D mapping information from 3D mapping reference database 112 to obtain an estimated view of the 3D mapping information at the estimated pose prior. Further, scene understanding unit 114 correlates the semantically segmented sub-views of the estimated view to the semantically segmented sub-views of the two-dimensional frame at the local pose to generate an estimate of the local pose of the vehicle.

In some examples, vehicle navigation unit 120 uses the estimate of the local pose of the vehicle to update estimates of a global heading of the vehicle or a position of the vehicle. For example, vehicle navigation unit 120 may use the estimate of the local pose of the vehicle to generate constraints on a heading, position, or orientation of the vehicle so as to increase an accuracy in the estimates of the global heading of the vehicle or the position of the vehicle. In yet further examples, vehicle navigation unit 120 fuses IMU data received from IMU 130 and GPS data received from GPS 132 with the estimate of the local pose to increase the accuracy of the estimate of the global heading or the estimate of the position of the vehicle.

In some examples, augmented reality rendering unit 134 uses the estimate of the position 712 from vehicle navigation unit 120 to generate augmented reality data 710. For example, augmented reality data 710 may be used to implement an improved augmented reality driving system. In one example, augmented reality rendering unit 134 may generate, for display via output devices 703 for presentation to a user, global heading measurements obtained from vehicle navigation unit 120. In another example, augmented reality data 710 may generate a rendered depth map for the scene perceived from camera 101. By fusing these global heading measurements with data from other sensors, such as GPS 132 or IMU 130, augmented reality rendering unit 134 may continuously estimate precise 6 degrees of freedom (DOF) global poses for the vehicle.

Output device 704 may include a display, sound card, video graphics adapter card, speaker, presence-sensitive screen, one or more USB interfaces, video and/or audio output interfaces, or any other type of device capable of generating tactile, audio, video, or other output. Output device 704 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, output device 704 may produce an output to a user in another fashion, such as via a sound card, video graphics adapter card, speaker, presence-sensitive screen, one or more USB interfaces, video and/or audio output interfaces, or any other type of device capable of generating tactile, audio, video, or other output. In some examples, output device 704 may include a presence-sensitive display that may serve as a user interface device that operates both as one or more input devices and one or more output devices.

Figure 8:
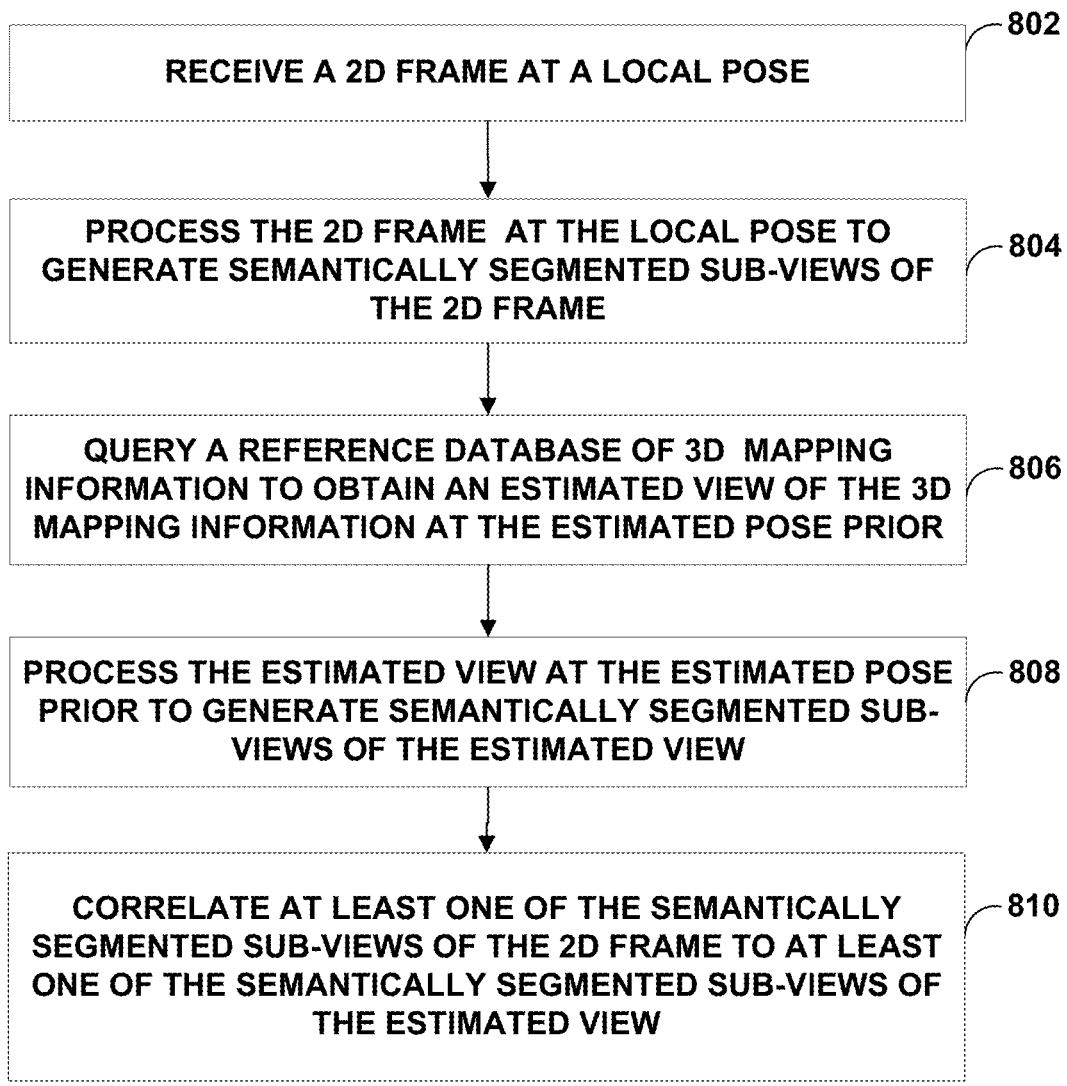
FIG. 8 is a flowchart illustrating an example operation in accordance with the techniques of the disclosure.

FIG. 8 is a flowchart illustrating an example operation in accordance with the techniques of the disclosure. For convenience, FIG. 8 is described with respect to FIG. 7. However, the operation of FIG. 8 may be implemented via numerous other systems, such as the system of FIG. 1.

With respect to the example operation of FIG. 8, computation engine 730 receives, from camera 101, a 2D frame that depicts a local pose of a vehicle (802). Semantic georegistration unit 104 of computation engine 730 processes the 2D frame that depicts the local pose of the vehicle to generate semantically segmented sub-views of the 2D image frame at the local pose (804). For example, semantic georegistration unit 104 classifies one or more pixels in the 2D image frame at the local pose as belonging to one or more objects. Each object of the one or more objects includes an object type that corresponds to one of the semantically segmented sub-views. Examples of such object types may include: Sky, Building, Pole, Road Marking, Road, Pavement, Tree, Sign Symbol, Fence, Vehicle, Pedestrian, and/or Bicycle. In other examples, semantic georegistration unit 104 classifies each of the one or more pixels as belonging to other types of objects not expressly described herein. Further, semantic georegistration unit 104 applies, to each of the classified one or more pixels, a label corresponding to the object type.

Semantic georegistration unit 104 queries 3D mapping reference database 112 to obtain an estimated view of the 3D mapping information at an estimated pose prior of the vehicle (806). For example, without having to model structures scanned by, e.g., an aerial LIDAR used to generate 3D mapping reference database 112, semantic georegistration unit 104 renders, using the 3D mapping information, a point cloud from the estimated pose prior (e.g., or from any arbitrary view), to simulate the pose and parameters of a real camera.

Further, semantic georegistration unit 104 of computation engine 730 processes the estimated view of the 3D mapping information at the estimated pose prior to generate semantically segmented sub-views of the estimated view of the 3D mapping information at the estimated pose prior (808). For example, semantic georegistration unit 104 classifies one or more pixels in the estimated view of the 3D mapping information at the estimated pose prior as belonging to one or more objects. In similar fashion to the operation described above with respect to element 804, each object of the one or more objects includes an object type that corresponds to one of the semantically segmented sub-views. Further, semantic georegistration unit 104 applies, to each of the classified one or more pixels, a label corresponding to the object type.

Scene understanding unit 114 correlates at least one of the semantically segmented sub-views of the 2D image frame at the local pose to at least one of the semantically segmented sub-views of the estimated view of the 3D mapping information at the estimated pose prior (810). For example, scene understanding unit 114 correlates an object type of at least one pixel of at least one of the semantically segmented sub-views of the 2D image frame at the local pose to an object type of at least one pixel of at least one of the semantically segmented sub-views of the estimated view of the 3D mapping information at the estimated pose prior. In some examples, scene understanding unit 114 correlates a horizon depicted in at least one of the semantically segmented sub-views of the 2D image frame to a horizon depicted in at least one of the semantically segmented sub-views of the estimated view of the 3D mapping information at the estimated pose prior.

In some examples, based on the correlation between the at least one of the semantically segmented sub-views of the 2D image frame at the local pose to the at least one of the semantically segmented sub-views of the estimated view of the 3D mapping information at the estimated pose prior, scene understanding unit 114 generates a scene representation at the local pose. In some examples, based on the correlation between the at least one of the semantically segmented sub-views of the 2D image frame at the local pose to the at least one of the semantically segmented sub-views of the estimated view of the 3D mapping information at the estimated pose prior, vehicle navigation unit 120 may generate and/or update estimates of a local pose of the vehicle. For example, vehicle navigation unit 120 may use differences between the at least one of the semantically segmented sub-views of the 2D image frame at the local pose and the at least one of the semantically segmented sub-views of the estimated view of the 3D mapping information at the estimated pose prior to generate estimates of a movement of the vehicle, such as translation or rotation, and use such information to generate estimates on a global heading of the vehicle. In some examples, based on the correlation between the at least one of the semantically segmented sub-views of the 2D image frame at the local pose to the at least one of the semantically segmented sub-views of the estimated view of the 3D mapping information at the estimated pose, prior vehicle navigation unit 120 may generate and/or update estimates of a local pose of the vehicle.

In other examples, based on the correlation between the at least one of the semantically segmented sub-views of the 2D image frame at the local pose to the at least one of the semantically segmented sub-views of the estimated view of the 3D mapping information at the estimated pose prior, scene understanding unit 114 generates estimates of a depth of an object in the two-dimensional frame. For example, scene understanding unit 114 generates a rendered depth map of the 2D frames 102 at the local pose of system 100. Scene understanding unit 114 recovers a depth of new objects and dynamic scene with absolute scale by comparing a georegistered 2D frame 102 and corresponding estimated view of the 3D mapping information at the estimated pose prior. Scene understanding unit 114 generates a full depth map by verifying, via object hypothesis verification unit 116, each object hypothesis from semantic segmentation and respecting dynamic scene change from past data as described above with respect to FIG. 1.

Accordingly, the techniques of the disclosure may allow for efficient, real-time computation of global heading measurements and a rendered depth map at video frame rate speeds. Further, the techniques of the disclosure may allow for the estimation of absolute depth values for dynamic objects based on the rendered depth map and updating of the rendered depth map to reflect scene changes over time. Furthermore, the techniques of the disclosure herein may be able to improve both navigation accuracy and depth map quality for augmented reality driving.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A system comprising:
an image capture device configured to generate a two-dimensional frame at a local pose; and
a computation engine executing on one or more processors and configured to query, based on an estimated pose prior, a reference database of three-dimensional mapping information to obtain an estimated view of the three-dimensional mapping information at the estimated pose prior,
wherein the computation engine is further configured to process the estimated view at the estimated pose prior to generate semantically segmented sub-views of the estimated view,
wherein the computation engine is further configured to correlate, based on at least one of the semantically segmented sub-views of the estimated view, the estimated view to the two-dimensional frame, and
wherein the computation engine is further configured to, based on the correlation, generate and output data for augmenting a reality represented in at least one frame captured by the image capture device.

2. The system of claim 1, wherein, to generate the data for augmenting the reality represented in the at least one frame captured by the image capture device, the computation engine is further configured to generate, based on the correlation, a scene representation at the local pose.

3. The system of claim 1, wherein to generate the data for augmenting the reality represented in the at least one frame captured by the image capture device, the computation engine is further configured to generate, based on the correlation, an estimate of the local pose.

4. The system of claim 3, wherein, to generate the estimate of the local pose, the computation engine is further configured to generate an estimate of at least one of a position or orientation of the local pose.

5. The system of claim 1, wherein, to generate and output the data for augmenting the reality represented in the at least one frame captured by the image capture device, the computation engine is further configured to generate, based on the correlation, an estimate of a depth of an object in the two-dimensional frame.

6. The system of claim 5, wherein, to estimate the depth of the object in the two-dimensional frame, the computation engine is further configured to estimate, based on at least one of the semantically segmented sub-views of the estimated view, a distance between a candidate object and a reference plane in the two-dimensional frame,
wherein the computation engine is further configured to determine, based on the distance between the candidate object and the reference plane, that a probability that the candidate object is representative of the object exceeds a threshold, and
wherein, in response to determining that the probability that the candidate object is representative of the object exceeds the threshold, the computation engine is further configured to estimate the depth of the object by fitting a three-dimensional reference plane to the two-dimensional frame.

7. The system of claim 1,
wherein the computation engine is further configured to update, based on the correlation, a global heading for a device, and
wherein the computation engine is further configured to update, based on the global heading, a global pose for the device.

8. The system of claim 1,
wherein the computation engine is further configured to process the two-dimensional frame at the local pose to generate semantically segmented sub-views of the two-dimensional frame at the local pose,
wherein, to correlate the estimated view to the two-dimensional frame, the computation engine is configured to correlate at least one of the semantically segmented sub-views of the estimated view to at least one of the semantically segmented sub-views of the two-dimensional frame at the local pose.

9. The system of claim 8, wherein, to generate the semantically segmented sub-views of the two-dimensional frame at the local pose, the computation engine is further configured to:
classify one or more pixels in the two-dimensional frame at the local pose as belonging to one or more objects, wherein each object of the one or more objects includes an object type of one or more object types that corresponds to one of the semantically segmented sub-views; and apply, to each of the classified one or more pixels, a label corresponding to the object type.

10. The system of claim 1, further comprising an inertial measurement unit (IMU) configured to generate IMU data that indicates the estimated pose prior.

11. The system of claim 1, further comprising the reference database of three-dimensional mapping information.

12. The system of claim 11, wherein the three-dimensional mapping information comprises three-dimensional light imaging detection and ranging (LIDAR) mapping information.

13. The system of claim 1, wherein, to generate the semantically segmented sub-views of the estimated view, the computation engine is further configured to:

classify one or more pixels in the estimated view at the estimated pose prior as belonging to one or more objects, wherein each object of the one or more objects includes an object type of one or more object types that corresponds to one of the semantically segmented sub-views; and apply, to each of the classified one or more pixels, a label corresponding to the object type.

14. The system of claim 13, wherein the one or more object types comprise at least one of: a sky; a building; a pole; a road marking; a road; pavement; a tree; a sign; a fence; a vehicle; a pedestrian; or a bicycle.

15. The system of claim 1, wherein, to correlate the estimated view to the two-dimensional frame, the computation engine is further configured to:

extract a horizon from the at least one of the semantically segmented sub-views of the estimated view;

extract a horizon from the two-dimensional frame; and correlate, based on the horizon extracted from the at least one of the semantically segmented sub-views of the estimated view and the horizon extracted from the two-dimensional frame, the estimated view to the two-dimensional frame.

16. The system of claim 1, wherein, to generate the semantically segmented sub-views of the estimated view, the computation engine is further configured to apply, to the estimated view, a deep learning neural network having a model trained with three-dimensional mapping information having objects each labeled with semantic labels.

17. The system of claim 1, wherein the estimated view of the three-dimensional mapping information at the estimated pose prior comprises a simulated three-dimensional representation.

18. A method comprising:

receiving, by a computation engine executing on one or more processors and from an image capture device, a two-dimensional frame at a local pose;

querying, by the computation engine and based on an estimated pose prior, a reference database of three-dimensional mapping information to obtain an estimated view of the three-dimensional mapping information at the estimated pose prior;

processing, by the computation engine, the estimated view at the estimated pose prior to generate semantically segmented sub-views of the estimated view;

correlating, by the computation engine and based on at least one of the semantically segmented sub-views of the estimated view, the estimated view to the two-dimensional frame;

generating, based on the correlation, data for augmenting a reality represented in at least one frame captured by the image capture device; and outputting the data.

19. The method of claim 18, wherein generating the data for augmenting the reality represented in the at least one frame captured by the image capture device comprises generating, based on the correlation, a scene representation at the local pose.

20. The method of claim 18, wherein generating the data for augmenting the reality represented in the at least one frame captured by the image capture device comprises generating, based on the correlation, an estimate of the local pose.

21. The method of claim 18, wherein, generating the data for augmenting the reality represented in the at least one frame captured by the image capture device comprises generating, based on the correlation, an estimate of a depth of an object in the two-dimensional frame.

22. A non-transitory computer-readable medium comprising instructions that, when executed, cause one or more processors to execute a computation engine configured to:

receive, from an image capture device, a two-dimensional frame at a local pose;

query, based on an estimated pose prior, a reference database of three-dimensional mapping information to obtain an estimated view of the three-dimensional mapping information at the estimated pose prior;

process the estimated view at the estimated pose prior to generate semantically segmented sub-views of the estimated view;

correlate, based on at least one of the semantically segmented sub-views of the estimated view, the estimated view to the two-dimensional frame;

generate, based on the correlation, data for augmenting a reality represented in at least one frame captured by the image capture device; and output the data.

* * * * *